(12) United States Patent
Kulm

(10) Patent No.: US 12,400,023 B1
(45) Date of Patent: Aug. 26, 2025

(54) FRAMEWORK FOR IDENTIFYING HOST-BASED ARTIFACTS IN DARK WEB INVESTIGATIONS

(71) Applicant: Dakota State University, Madison, SD (US)

(72) Inventor: Arica Kulm, Madison, SD (US)

(73) Assignee: Dakota State University, Madison, SD (US)

( * ) Notice: Subject to any disclaimer, the term of this patent is extended or adjusted under 35 U.S.C. 154(b) by 315 days.

(21) Appl. No.: 17/984,800

(22) Filed: Nov. 10, 2022

Related U.S. Application Data

(60) Provisional application No. 63/277,864, filed on Nov. 10, 2021.

(51) Int. Cl.
  *G06F 21/62* (2013.01)
  *G06F 21/57* (2013.01)

(52) U.S. Cl.
  CPC ........ *G06F 21/6245* (2013.01); *G06F 21/577* (2013.01)

(58) Field of Classification Search
  CPC .................................................. G06F 21/6245
  See application file for complete search history.

(56) References Cited

U.S. PATENT DOCUMENTS

| | | | | |
|---|---|---|---|---|
| 9,288,219 | B2* | 3/2016 | Abuelsaad | H04L 63/1408 |
| 11,301,522 | B1* | 4/2022 | Kim | G06F 16/9574 |
| 11,477,226 | B2* | 10/2022 | Alabdulhadi | G06F 21/577 |
| 2015/0040217 | A1* | 2/2015 | Abuelsaad | H04L 63/1408 726/22 |
| 2016/0321466 | A1* | 11/2016 | Smyth | G06Q 99/00 |
| 2017/0012942 | A1* | 1/2017 | Wittenschlaeger | H04L 63/0281 |
| 2018/0081934 | A1* | 3/2018 | Byron | H04L 63/10 |
| 2019/0007440 | A1* | 1/2019 | Lavi | G06Q 50/26 |

(Continued)

OTHER PUBLICATIONS

M. R. Arshad, M. Hussain, H. Tahir, S. Qadir, F. I. Ahmed Memon and Y. Javed, "Forensic Analysis of Tor Browser on Windows 10 and Android 10 Operating Systems," in IEEE Access, vol. 9, p. 141273-141294, 2021, doi: 10.1109/ACCESS.2021.3119724. keywords: {Browsers; Operating systems; Privacy; Forensics; (Year: 2021).*

(Continued)

*Primary Examiner* — Techane Gergiso
(74) *Attorney, Agent, or Firm* — Suiter Swantz IP

(57) ABSTRACT

A non-transitory computer readable medium is disclosures. The non-transitory medium may store a dark web artifact framework program including a set of program instructions, configured to cause the one or more processors to: identify an operating system of the target device; identify a dark web software installation method; recursively execute a series of nodes until a plurality of artifact descriptors are generated, the series of nodes associated with the identified operating system and the identified dark web software installation method, the plurality of artifact descriptors associated with one or more host-based artifacts indicative of the dark web activity, the plurality of artifact descriptors including at least one of file locations of the one or more host-based artifacts or actions required to obtain the one or more host-based artifacts; and identify the one or more host-based artifacts on the target device based on the generated plurality of artifact descriptors.

20 Claims, 23 Drawing Sheets

(56) References Cited

U.S. PATENT DOCUMENTS

2019/0317968 A1* 10/2019 De Los Santos Vilchez .............. H04L 63/1433
2019/0349351 A1* 11/2019 Verma ..................... H04L 63/30

OTHER PUBLICATIONS

1. Pizzolante, Raffaele, et al. "A machine learning-based memory forensics methodology for TOR browser artifacts." Concurrency and Computation: Practice and Experience 33.23 (2021): (Year: 2021).*

"How to: Use Tor on macOS", Surveillance Self-Defense, Jul. 10, 2023, Retrieved Aug. 23, 2020, from https://ssd.eff.org/en/module/how-use-tor-macos.

"Knowledge is Power! Using the macOS/iOS knowledgeC.db Database to Determine Precise User and Application Usage, Aug. 6, 2018", www.mac4n6.com; Retrieved Aug. 23, 2020, from https://www.mac4n6.com/blog/2018/8/5/knowledge-is-power-using-the-knowledgecdb- database-on-macos-and-ios-to-determine-precise-user-and-application-usage.

"Mac OS Daily Logs" Salt Forensics, Dec. 11, 2018, Retrieved Aug. 23, 2020, from https://salt4n6.com/2018/12/11/mac-os-daily-logs/.

"Uninstalling" Tor Project, Tor Browser Manual, Retrieved Aug. 16, 2020, from https://tb-manual.torproject.org/uninstalling/.

"Welcome to Tor Metrics", Retrieved Sep. 29, 2019, from https://metrics.torproject.org/.

Al Jawaheri, et al. (2020). Deanonymizing Tor hidden service users through Bitcoin transactions analysis. Computers & Security, vol. 89, 101684. https://doi.org/10.1016/j.cose.2019.101684.

Baryamureeba, Venansius et al. (2004). The enhanced digital investigation process model; Proceedings of the Digital Forensic Research Conference, DFRWS 2004 USA, 1-9.

Bazli, B. et al. (2017). The dark side of I2P, a forensic analysis case study. Systems Science and Control Engineering, 5(1), 278-286. https://doi.org/10.1080/21642583.2017.1331770.

Bischoff, Paul, "How to Access the Dark Net and Deep Web Safely—Step by Step Guide", Retrieved Dec. 29, 2019, from https://www.comparitech.com/blog/vpn-privacy/how-to-access-the-deep-web-and-darknet/.

Cardenas-Haro, et al. (2016). Tails linux operating system: The amnesiac incognito system in times of high surveillance, its security flaws, limitations, and strengths in the fight for democracy. Security Solutions for Hyperconnectivity and the Internet of Things, 260-271. https://doi.org/10.4018/978-1-5225-0741-3.ch010.

Carrier, B., et al. (2004). An Event-Based Digital Forensic Investigation Framework; Digital Forensic Research Conference. Retrieved from https://www.dfrws.org/sites/default/files/session-files/paper-an_event-based_digital_forensic_investigation_framework.pdf.

Clarke, Ian et al. "Protecting Free Expression Online with Freenet", IEEE Internet Computing; Jan.-Feb. 2002; http://computer.org/internet/, pp. 40-49.

Cox, J., (2016) "Operation Hyperion" Targets Suspected Dark Web Users Around The World—VICE. Retrieved Dec. 26, 2019, from https://www.vice.com/en_us/article/z438d8/operation-hyperion-targets-suspected-dark- web-users-around-the-world.

Creswell, J. W. (2014). Third Edition, Research Design Qualitative, Quantitative, and Mixed Methods Approaches. Sage Publications.

Darcie, W. et al. (2015). Online Anonymity: Forensic Analysis of the Tor Browser Bundle, Retrieved from http://www.marshall.edu/forensics/files/WinklerDarcie_ResearchPaper_8-6-141.pdf.

Dayalamurthy, D. (2013). "Forensic Memory Dump Analysis And Recovery Of The Artefacts Of Using Tor Bundle Browser—The Need", Australian Digital Forensics Conference. https://doi.org/10.4225/75/57b3c7f3fb86e.

Digvijaysinh Rathod (2017), "Darknet Forensics"; International Journal of Emerging Trends & Technology in Computer Science (IJETTCS), vol. 6, Issue 4 (Jul.-Aug. 2017), pp. 77-79. Retrieved from https://github.com/HelloZeroNet/ZeroNet.

Dingledine, R. et al. (2004), "Tor: The second-generation onion router", USENIX Association, Proceedings of the 13th Conference of USENIX Security Symposium, San Diego, CA. https://doi.org/10.1.1.4.6896.

Doran, M. D. (2014). "A Forensic Look at Bitcoin Cryptocurrency", SANS Institute, A Capstone Project Submitted to the Faculty of Utica College May 2014 in Partial Fulfillment of the Requirements for the Degree of Master of Science in Cybersecurity. (May).

European Monitoring Centre for Drugs and Drug Addiction (2017); "Drugs and the darknet, Perspectives for enforcement, research and policy", https://doi.org/10.2810/783427.

Jacoby, Corianna et al. Dec. 15, 2016, "The Onion Router and the Darkweb" Retrieved from https://guardianproject.

Jadoon, Abid Khan et al. (2019), "Forensic Analysis of Tor Browser: A Case Study for Privacy and Anonymity on the Web", Forensic Science International, vol. 299, Jun. 2019, pp. 59-73, https://doi.org/10.1016/j.forsciint.2019.03.030.

Kent, Karen et al. "Guide to Integrating Forensic Techniques into Incident Response," National Institute of Standards and Technology (NIST), Special Publication 800-86, Computer Security Division, Gaithersburg, Aug. 2006.

Michael Kohn et al. (2006) "Framework for a Digital Forensic Investigation", Information and Computer Security Architectures Research Group, Dept. of Computer Science, University of Pretoria, https://doi.org/10.14943/jjvr.64.suppl.s33.

Nordine, J., Osint Framework. Retrieved from https://github.com/lockfale/osint- framework.

Paul, Katie A. (2018) "Ancient Artifacts vs. Digital Artifacts: New Tools for Unmasking the Sale of Illicit Antiquities on the Dark Web", Arts 2018, 7, 12. https://doi.org/10.3390/arts7020012.

Pollitt, M. M. (1995), Computer Forensics: An Approach to Evidence in Cyberspace, 487-491, 18th National Information Systems Security Conference, Oct. 10-13, 1995, Baltimore Convention Cen. pdf.

Pollitt, Mark, "A History of Digital Forensics", Advances in Digital Forensics VI, pp. 3-15, https://doi.org/10.1007/978-3-642-15506-2_1T.

Popular Computer Forensics Top 21 Tools. (2019). Retrieved Sep. 28, 2019, from Infosec website: https://resources.infosecinstitute.com/computer-forensics-tools/#/gref.

Reith, Mark et al. (2009). Two models of digital forensic examination. 4th International Workshop on Systematic Approaches to Digital Forensic Engineering, SADFE 2009, 1(3), 42-53. https://doi.org/10.1109/SADFE.2009.8.

Richard III, Golden G. et al. (2014) "In lieu of swap : Analyzing compressed RAM in Mac OS X and Linux", Digital Investigation, vol. 11, Supplement 2, Aug. 2014, pp. S3-S12. https://doi.org/10.1016/j.diin.2014.05.011.

The Washington Post. (n.d.). NSA report on the Tor encrypted network. Retrieved Oct. 26, 2019, from The Washington Post website: https://www.washingtonpost.com/apps/g/page/world/nsa-report-on-the-tor-encrypted-network/501/.

Wadas, D. J., Bitcoin and Blockchain Forensics, Apr. 2018.

Warren, Aron (2017). TOR Browser Artifacts in Windows 10, SANS Institute 2021.

Zajacz Rita (2017) "Silk Road: The market beyond the reach of the state", The Information Society, vol. 33, Issue 1, Jan.-Feb. 2017, pp. 23-34. https://doi.org/10.1080/01972243.2016.1248612.

* cited by examiner

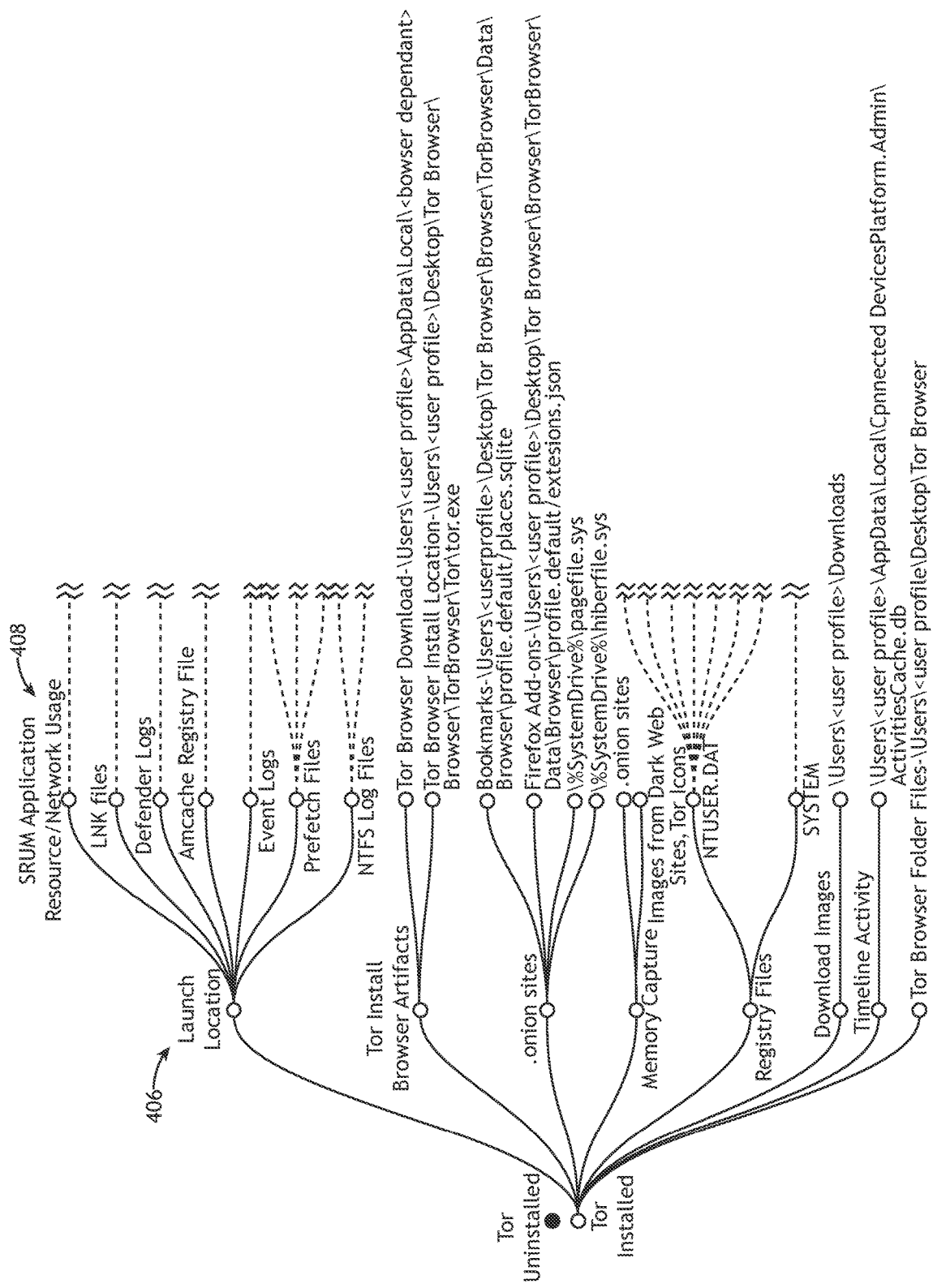

FRAMEWORK FOR IDENTIFYING HOST-BASED ARTIFACTS IN DARK WEB INVESTIGATIONS

CROSS-REFERENCE TO RELATED APPLICATIONS

The present application claims the benefit under 35 U.S.C § 119(e) to U.S. Provisional Application No. 63/277,864, entitled "FRAMEWORK FOR IDENTIFYING HOST-BASED ARTIFACTS IN DARK WEB INVESTIGATIONS," filed on Nov. 10, 2021, which is incorporated herein by reference in the entirety.

TECHNICAL FIELD

The present disclosure relates generally to digital forensics of dark web activity and, more particularly, to identifying host-based artifacts indicative of dark web activity.

BACKGROUND

The dark web is the hidden part of the internet that is not indexed by search engines and is only accessible with a specific browser (e.g., The Onion Router (Tor) or the Invisible Internet Project (I2P)). Tor was initially developed by the US government for private communications and is still widely used by individuals all over the world for that purpose. In addition to private communications, citizens around the world access content restricted in their country, or as a way around restricted internet sites in North Korea, Iran, or the Great Firewall of China, for example. In fact, the New York Times has had a constant dark web .onion page for years to ensure people all over the world can access their site regardless of internet censorship in their home countries. During the Arab Spring, activists utilized Tor to circumvent government restrictions and communicate on social media. However, the dark web has become synonymous with nefarious and illicit content and there are a significant number of .onion sites that sell weapons, drugs, stolen credit cards, stolen user credentials, child pornography, alleged murder-for-hire, hackers for hire, exotic animals, stolen antiquities, and more. Given the fundamental goal of privacy and anonymity, there are limited techniques for finding forensic artifacts and evidence files when investigating misuse and criminal activity in the dark web. Further, it may be difficult to locate evidence of dark web use on a computer that may contain terabytes of data. In addition to the built-in anonymity of the browsers, the landscape of the dark web is constantly shifting with the average lifespan of a dark web market being just eight months. Since the dark web is not indexed like surface web sites, search engines such as Google, Bing, Yahoo are not able to reach these sites. Finding traces of dark web activity indicating a connection to illegal material may be the difference between a suspect being charged with a crime or being allowed to go free to continue to commit these crimes. Presenting paper evidence is clear and obvious because it is visible to the human eyes. However, digital evidence requires the use of tools and must follow a process that is documented, reliable, repeatable, and presentable to members of the court for it to be useful in a criminal case. It may therefore be desirable to provide systems and methods to address the above deficiencies.

SUMMARY

A method is disclosed, in accordance with one or more embodiments of the present disclosure. In embodiments, the method includes receiving an operating system selection for a target device. In embodiment, the method includes receiving a dark web software installation method selection for the target device. In embodiment, the method includes recursively selecting, based on one or more forensic choices, a series of nodes of a dark web artifact framework until a plurality of artifact descriptors for the target device are generated, the series of nodes associated with the selected operating system of the target device and the selected dark web software installation method selection, a node of the series of nodes coupled to an additional node of the series of nodes via one or more branch segments, the plurality of artifact descriptors including at least one of file locations of one or more host-based artifacts or actions required to obtain the one or more host-based artifacts. In embodiments, the method includes identifying the one or more host-based artifacts on the target device based on the generated plurality of artifact descriptors, the one or more host-based artifacts indicative of dark web activity on the target device.

A non-transitory computer readable medium is disclosed, in accordance with one or more embodiments of the present disclosure. In embodiments, the non-transitory computer readable medium stores a dark web artifact framework program including a set of program instructions, when executed by one or more processors on a target device, cause the one or more processors to: identify an operating system of the target device; identify a dark web software installation method; recursively execute, based on one or more forensic choices, a series of nodes of the dark web artifact framework until a plurality of artifact descriptors for the target device are generated, the series of nodes associated with the identified operating system of the target device and the identified dark web software installation method selection, a node of the series of nodes coupled to an additional node of the series of nodes via one or more branch segments, the plurality of artifact descriptors associated with one or more host-based artifacts indicative of the dark web activity, the plurality of artifact descriptors including at least one of file locations of the one or more host-based artifacts or actions required to obtain the one or more host-based artifacts; and identify the one or more host-based artifacts on the target device based on the generated plurality of artifact descriptors.

A system is disclosed, in accordance with one or more embodiments of the present disclosure. In embodiments, the system includes a user device including a display and a user input device, the display configured to display an interactive graphical user interface (GUI) including a dark web artifact framework, the dark web artifact framework including a series of nodes, a series of branch segments, and a plurality of end-nodes, the series of branch segments configured to link a node of the series of nodes to one or more additional nodes of the series of nodes, the plurality of end-nodes associated with a plurality of artifact descriptors. In embodiments, the user device is configured to receive, via the user input device and the interactive GUI, an operating system selection for a target device. In embodiment, the user device is configured to receive, via the user input device and the interactive GUI, dark web software installation method selection for the target device. In embodiments, the user device is configured to recursively receive, via the user input device and the interactive GUI, one or more user selections of the series of nodes until a plurality of artifact descriptors for the target device are generated, the one or more user selections of the series of nodes based on one or more forensic choices of the user, the series of nodes associated with the selected operating system of the target device and the selected dark web software installation method, the generated plurality of artifact descriptors associated with the one or more host-based artifacts, the plurality of artifact descriptors including at least one of file locations of one or more host-based artifacts or actions required to obtain the one or more host-based artifacts.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1A:
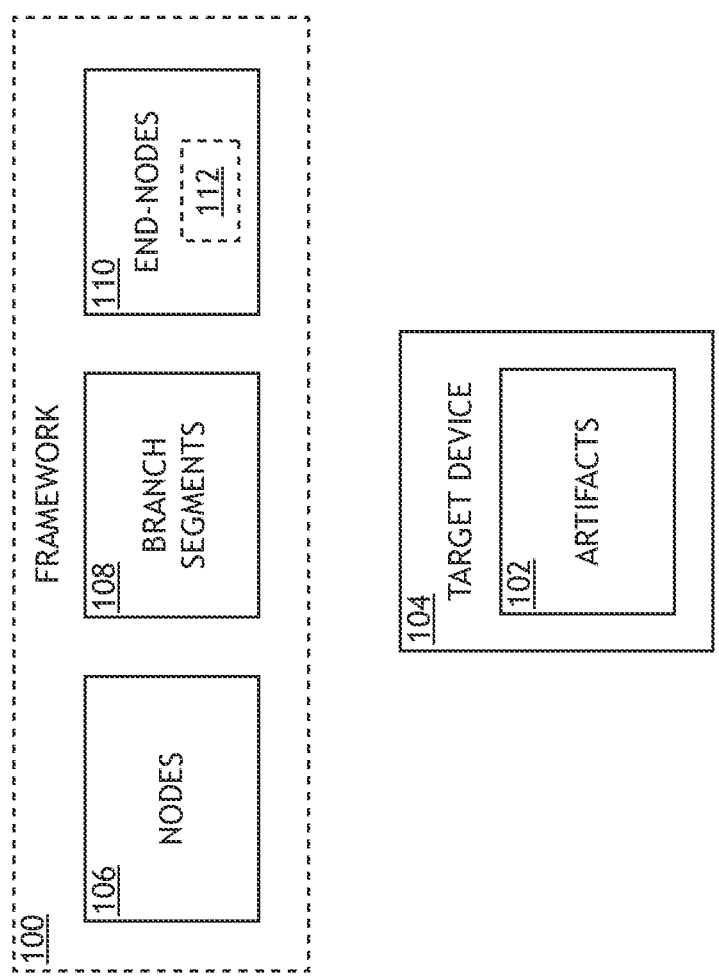
FIG. 1A illustrates a simplified block diagram of a Dark Web Artifact Framework, in accordance with one or more embodiments of the disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to systems and methods for identifying host-based artifacts of dark web activity on a target device such as, but not limited to, a computer, a tablet, or a mobile phone.

For the purposes of the present disclosure, the dark web or a dark web site are used to describe internet sites that are not indexed with the domain name service (DNS) and are typically accessed using an anonymizing browser such as, but not limited to, Tor or I2P. Such anonymizing browsers may utilize various techniques to provide anonymity to a user such as, but not limited to, obfuscating identifying information of the user or the target device to a dark web site, encrypted data transfer, limiting or eliminating tracking functions, or minimizing traces of the use of the browser on the machine. However, remaining anonymous to the site being connected to is different than learning no traces on the user's host system. As such, there is a need for a system and method for determining host-based artifacts on the user's host system.

Host-based artifacts may include, but are not limited to, files or other indicators located on a target device that are indicative that a particular activity was performed using the target device. In this way, identifying host-based artifacts may include inspection of the target device itself and may be distinguished from alternative digital forensic techniques that identify or intercept dark web activity or communications at a network level.

It is contemplated herein that different host-based artifacts may provide different types of information related to dark web activity on a particular target device. It is contemplated herein that software suitable for accessing the dark web and/or the user may take particular steps to limit the presence of host-based artifacts. However, host-based artifacts may nonetheless be present on the target device for various reasons such as, but not limited to, particularities of the operating system on the target device, particularities of how and where the dark web software was installed or executed, or particular actions of the user.

Some embodiments of the present disclosure are directed to identifying artifacts that software capable of accessing the dark web (e.g., dark web software) is or was installed on the target device. These artifacts may be valuable for, but are not limited to, establishing whether the target device was capable of accessing the dark web. Some embodiments of the present disclosure are directed to identifying artifacts that software capable of accessing the dark web has been used on the target device. These artifacts may be valuable for, but are not limited to, establishing that dark web activity occurred on the target device. Some embodiments of the present disclosure are directed to identifying artifacts of particular dark web activity on the target device such as, but not limited to sites visited, bookmarks, or downloaded files. These artifacts may be valuable for, but are not limited to, gathering information about particular dark web sites that were accessed on the target device and/or particular transactions conducted on the target device.

Some embodiments of the present disclosure are directed to identifying artifacts that a user has attempted to obfuscate dark web activity. For example, uninstalling dark web software may nonetheless leave traces on the target device that the software was previously installed on, regardless of whether it was launched from a USB, run locally, or run locally and deleted. For instance, the location of the anonymizing browser, how it was launched, when it was downloaded and installed, the user who downloaded and installed the browser, and may other artifacts may remain on the target device It is recognized herein that the particular host-based artifacts of dark web activity may be dependent on a wide variety of factors including, but not limited to, the operating system of the target device, the location of dark web software during execution (e.g., whether it was locally installed or executed from a bootable drive), whether the software was installed or deleted from the target device, or the sophistication or intent of the user regarding the removal of traces of dark web activity from the target device. Accordingly, it may be desirable to provide a framework for systematically identifying host-based artifacts on a target device in a way that considers these various factors.

Some embodiments of the present disclosure are directed to a framework for identifying host-based artifacts of dark web activity on a target device. In some embodiments, the framework is formed as a series of branch segments linked by nodes at branching points, where each branch segment begins at a node and ends at either another node or an artifact descriptor. Further, the artifact descriptors may be presented in various ways including, but not limited to, descriptive information associated with a potential artifact on the target device, a potential location of an artifact on the target device, a link to additional information, or actions required to identify or locate an artifact (e.g., utilize password-cracking software to determine a password, copy files to a different machine for processing, decrypt an image, or the like).

In this configuration, each node may represent the availability of alternative forensic choices along a branch, where the branch segments from the node represents the particular forensic choices. In this way, a user of the framework (e.g., herein referred to as an investigator) may selectively follow particular branches to identify potential artifacts of interest that may be relevant to the particular situation.

Referring now to FIGS. 1A-6B, systems and methods for identifying host-based artifacts of dark web activity on a target device is described in greater detail in accordance with one or more embodiments of the present disclosure.

Figure 1B:
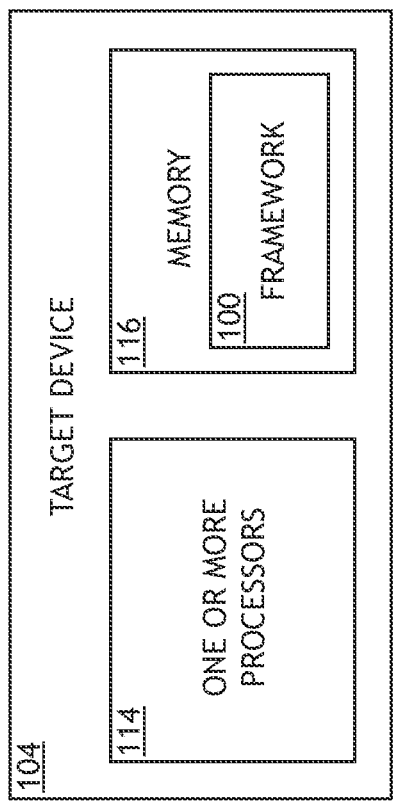
FIG. 1B illustrates a simplified block diagram of a Dark Web Artifact Framework, in accordance with one or more embodiments of the disclosure.
Figure 1C:
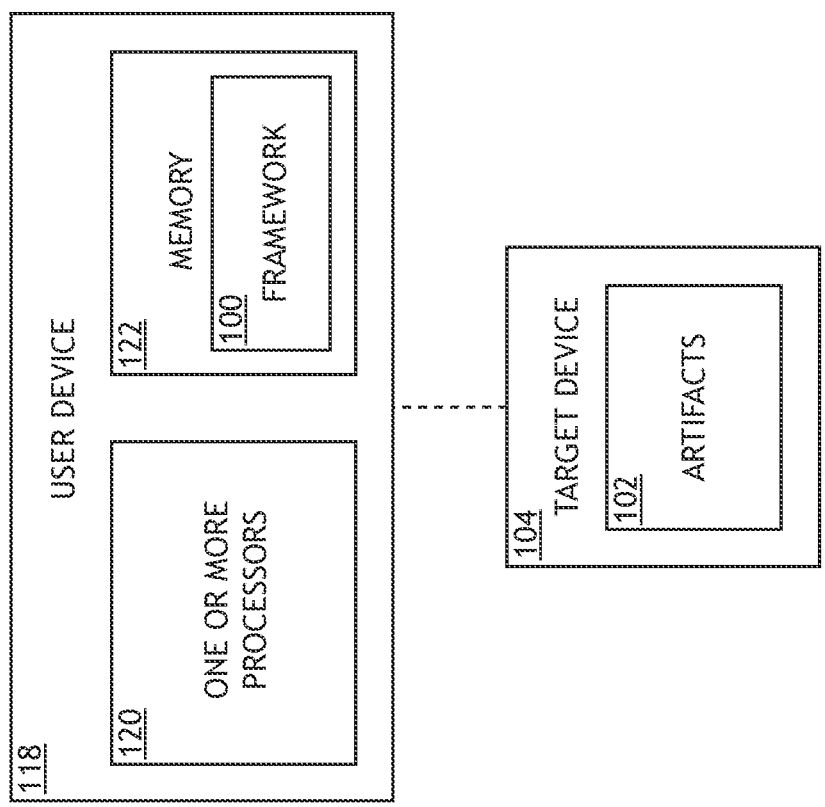
FIG. 1C illustrates a simplified block diagram of a Dark Web Artifact Framework, in accordance with one or more embodiments of the disclosure.

FIG. 1A illustrates a simplified block diagram of a Dark Web Artifact Framework 100, in accordance with one or more embodiments of the present disclosure. FIGS. 1B-1C illustrate simplified block diagrams of one or more implementations of the Dark Web Artifact Framework 100, in accordance with one or more embodiments of the present disclosure. For purposes of the present disclosure, "Dark Web Artifact Framework", "Artifact Framework", "framework", and variations thereof may be considered equivalent.

In embodiments, the framework 100 is used to identify artifacts 102 (e.g., host-based artifacts) on a target device 104. For example, the framework 100 may be used to identify artifacts that indicate that a user of the target device 104 accessed the dark web (e.g., dark web software) using dark web software. The artifacts 102 may include any type of host-based artifacts that provide an indication of dark web activity such as, but not limited to, files or folders on the target device 104 whose presence or content is indicative of dark web activity. The various artifacts 102 indicated by the framework 100 may provide various levels of certainty of dark web activity and/or various amounts of information associated with the specific content or frequency of dark web activity. For example, artifacts 102 may provide an indication of the installation of dark web software (e.g., Tor, or the like), the use of dark web software (e.g., event logs, timeline information, or the like), particular activity or data communicated over the dark web (e.g., downloaded images, bookmarks, browser add-ons, or the like), or a combination thereof. In some cases, dark web activity may be inferred by the presence of multiple artifacts 102 or combinations of artifacts 102. For example, the presence of one or more .onion sites may be a strong indicator of dark web activity, irrespective of whether the dark web software (e.g., Tor) is presently installed. By way of another example, the presence of Tor artifacts alone may indicate dark web activity. It is contemplated that the higher the number of artifacts present, the greater chance dark web activity may be inferred.

The target device 104 may include any type of computing system known in the art suitable for accessing the dark web. For example, the target device 104 may include a desktop computer, a laptop computer, a tablet, a mobile phone, or a single-board computer (e.g., a Raspberry Pi, or the like).

In some embodiments, the framework 100 is a tree structure (or tree diagram). For example, the framework 100 may be formed as a series of nodes 106, one or more branch segments 108 connecting the series of nodes 106, and one or more end-nodes 110 (or leave nodes or leaves 110). In one instance, the series of nodes 106 may be associated with one or more forensic choices, as discussed further herein. Further, the one or more end-nodes 110 may be associated with one or more artifact descriptors 112 associated with a particular artifact 102 that may be present on the target device 104. In this way, the framework 100 may provide numerous branches associated with various artifacts 102 that may be present on the target device 104.

It is contemplated herein that the framework 100 may include any number and configuration of nodes 106, branch segments 108, and end-nodes 110. Further, it is contemplated herein that the one or more nodes 106, branch segments 108, and end-nodes 110 may be organized in any structure. FIGS. 3-6B are provided merely for illustrative purposes and shall not be construed as limiting the scope of the present disclosure.

Referring generally to FIGS. 1B-1F, the framework 100 may be implemented in various ways to identify host-based artifacts on a target device.

Referring to FIG. 1B, in some embodiments, the framework 100 is implemented as an executable file executed by one or more processors 114 and stored in memory 116 on the target device 104 of interest. In this way, the one or more processors 114 may execute the executable file stored in memory 116 and may recursively search through the various nodes 106 and branches 108 of the framework 100 and identify various artifacts 102, locations to inspect for artifacts 102, and/or additional actions to take.

Referring to FIG. 1C, in some embodiments, the framework 100 is implemented as an executable file executed by one or more processors 120 of a user device 118 communicatively coupled to the target device 104 and stored in memory 122 on the user device 118. In this way, the one or more processors 120 of the user device 118 may execute the executable file stored in memory 122 and may recursively search through the various nodes 106 and branches 108 of the framework 100 and identify various artifacts 102, locations to inspect for artifacts 102, and/or additional actions to take.

Figure 1D:
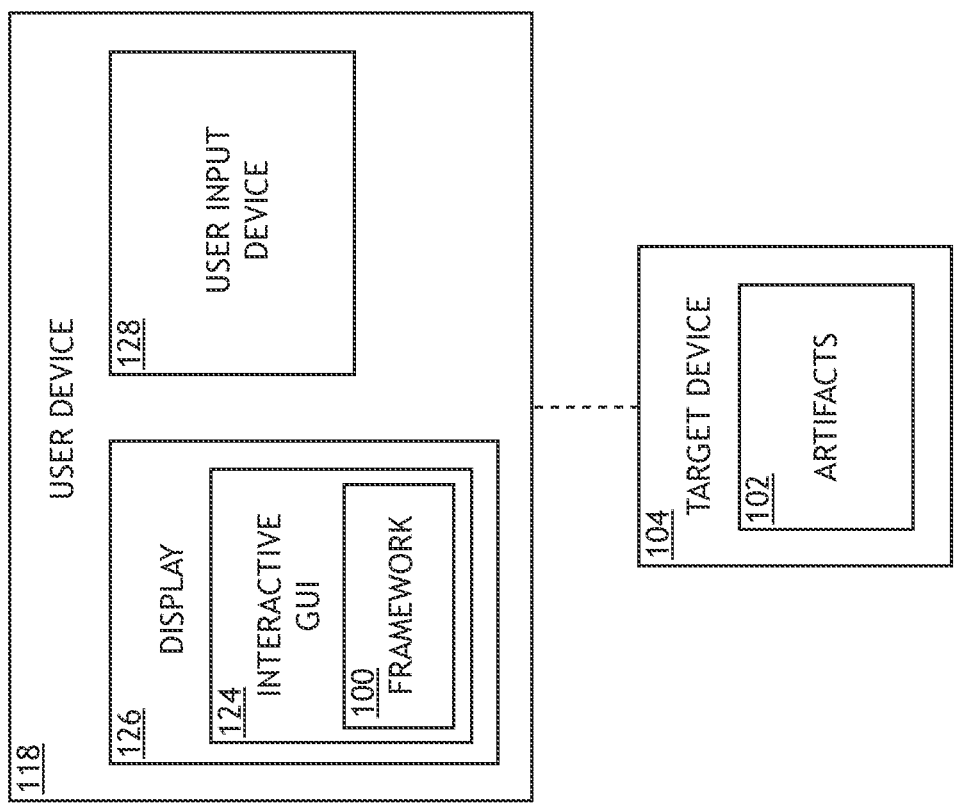
FIG. 1D illustrates a simplified block diagram of a Dark Web Artifact Framework, in accordance with one or more embodiments of the disclosure.

Referring to FIG. 1D, in some embodiments, the framework 100 is implemented as an interactive graphical user interface 124 displayed on a display 126 of the user device 118. For example, the display 126 of the user device 118 may display interactive nodes 106, such that a user may interact with the framework 100 via a user input device 128. In a non-limiting example, the framework 100 may be implemented using the open-source OSINT framework interface, which provides a mechanism for displaying clickable nodes 106 for selectively revealing or hiding branch segments 108. The interactive graphical interface 124 may further provide graphical indicators (e.g., colors, shapes, or the like) indicating whether a particular node 106 is expanded (e.g., branch segments 108 exiting the node 106 are visible) or contracted (e.g., branch segments 108 exiting the node 106 are hidden). For example, the interactive graphical interface 124 may include color-coded nodes 106, where a first color may indicate that a particular node 106 is expanded and an additional color may indicate that a particular node 106 is contracted. In this regard, a user who is interacting with the interactive graphical interface 124 may easily follow the framework 100 to identify host-based artifacts on the target device.

Figure 1E:
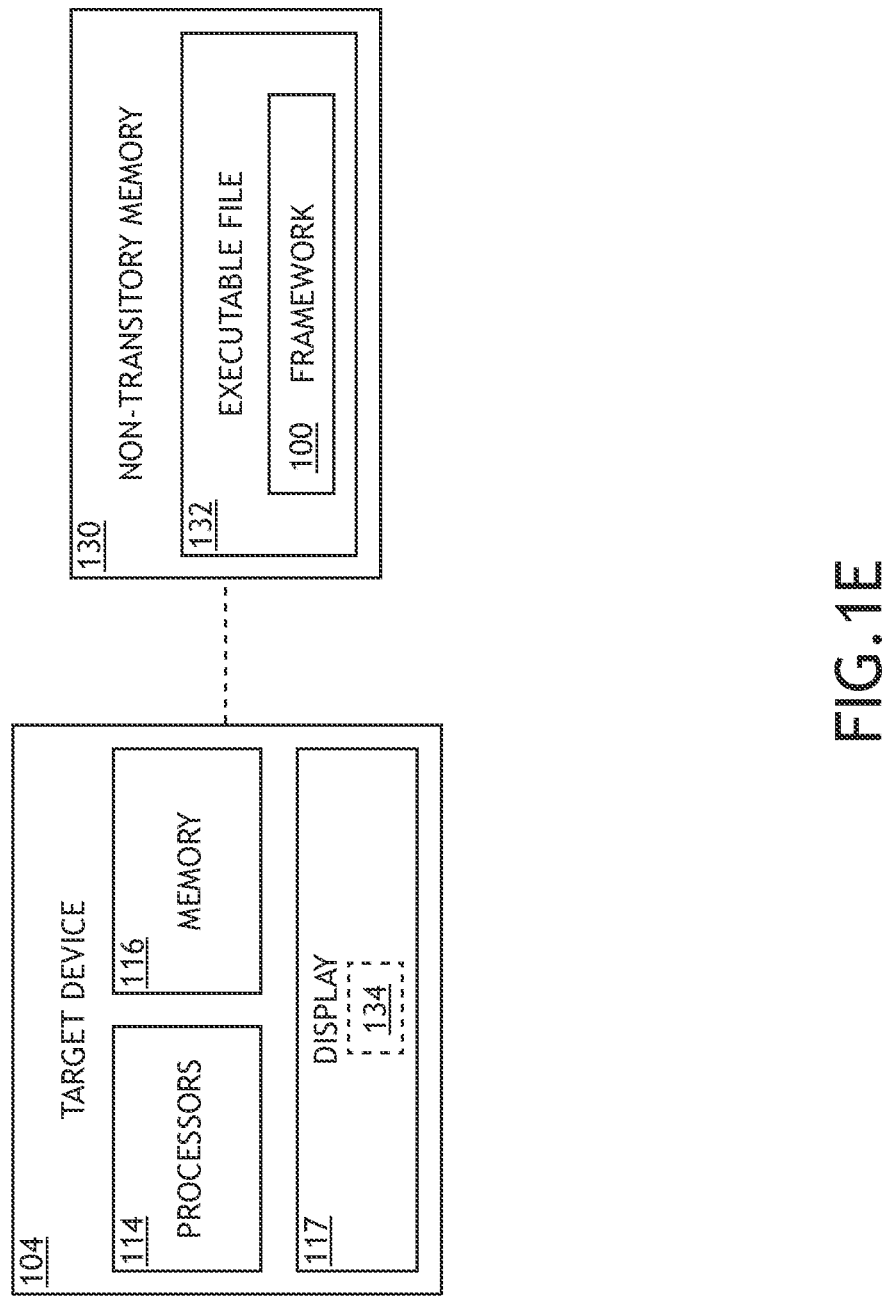
FIG. 1E illustrates a simplified block diagram of a Dark Web Artifact Framework, in accordance with one or more embodiments of the disclosure.
Figure 1F:
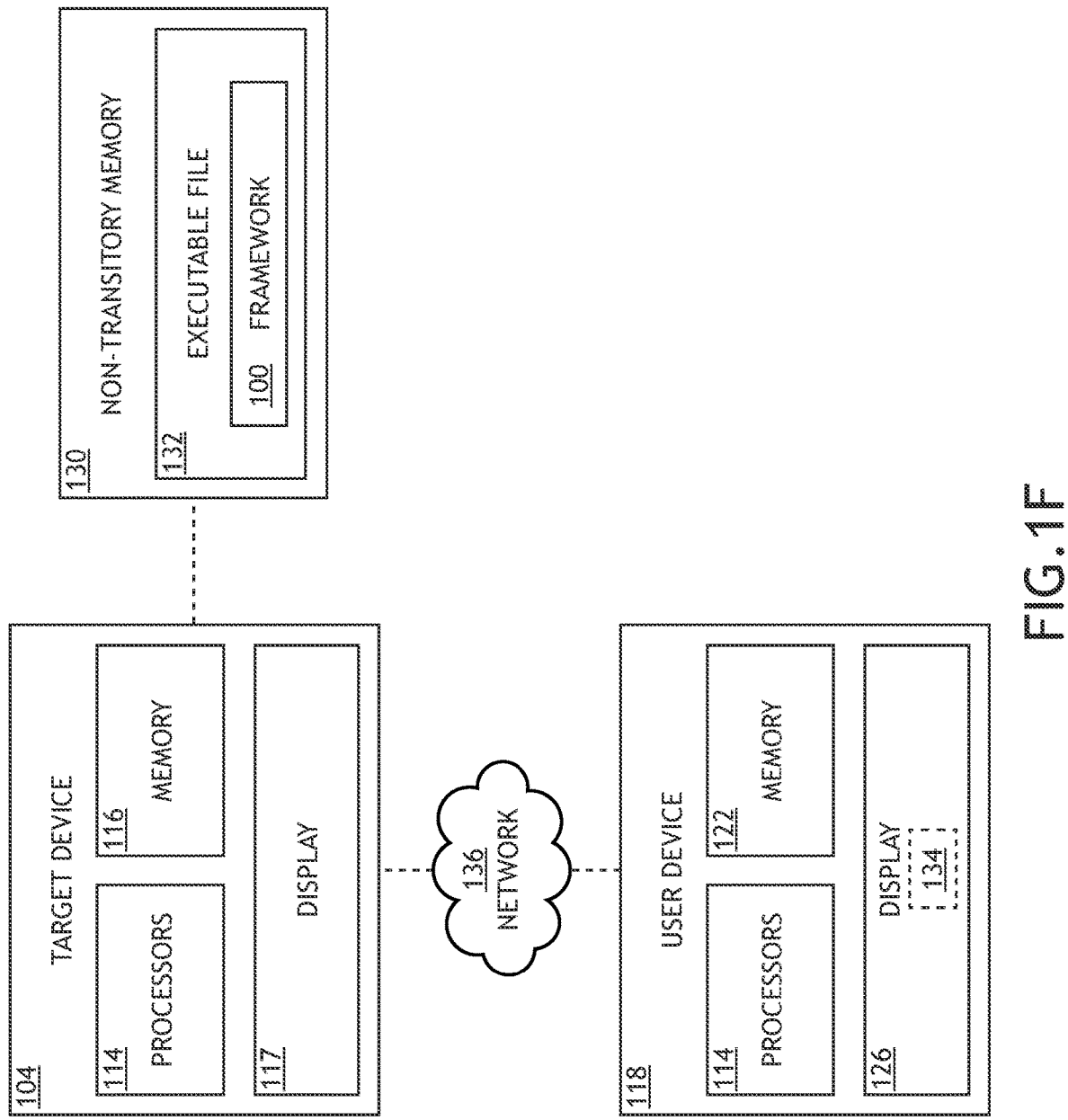
FIG. 1F illustrates a simplified block diagram of a Dark Web Artifact Framework, in accordance with one or more embodiments of the disclosure.

Referring to FIGS. 1E-1F, in some embodiments, the framework 100 is implemented as an executable file 132 stored on non-transitory computer readable medium 130. For example, the non-transitory medium 130 may be communicatively coupled to the target device 104 via a communication interface, such that the one or more processors 114 on the target device 104 may be configured to cause the one or more processors to perform a set of program instructions. In this way, the one or more processors 114 of the target device 104 may execute the executable file and may recursively search through the various nodes 106 and branches 108 of the framework 100 and identify various artifacts 102, locations to inspect for artifacts 102, and/or additional actions to take.

The non-transitory medium 130 may include any type of non-transitory computer readable medium including, but not limited to, a flash drive, floppy disk, CD-ROM, and the like.

The communication interface may include, but is not limited to, a universal serial bus (USB) cable, USB-C cable, lightning cable, and the like.

The executable file 132 may include any type of executable file including, but not limited to, .exe files, .bat files, .com files, .cmd files, .inf files, .ipa files, .osx files, .pif files, .run files, and the like.

In some embodiments, the one or more processors 114 of the target device 104 may be configured generate a dark web activity prediction report including one or more indicators of dark web activity as identified by the framework 100. Referring to FIG. 1E, in some embodiments, the generated dark web activity prediction report 134 may be displayed as an HTML file on a display 117 of the target device. Referring to FIG. 1F, in some embodiments, the one or more processors 114 may be configured to provide the generated dark web activity prediction report 134 to the user device 118 via a network 136, where the user device 118 may be configured to display the report 134 as an HTML file on the display 126. It is contemplated herein that it may be preferable to store the executable file on a non-transitory medium, such that the target device is not modified, in accordance with sound forensic practices. For example, where the target device 104 is corrupted (e.g., contain corrupted files, or the like), the framework 100 on the executable file of the non-transitory medium may be isolated, such that the executable file (including the framework 100) is not corrupted.

Figure 2:
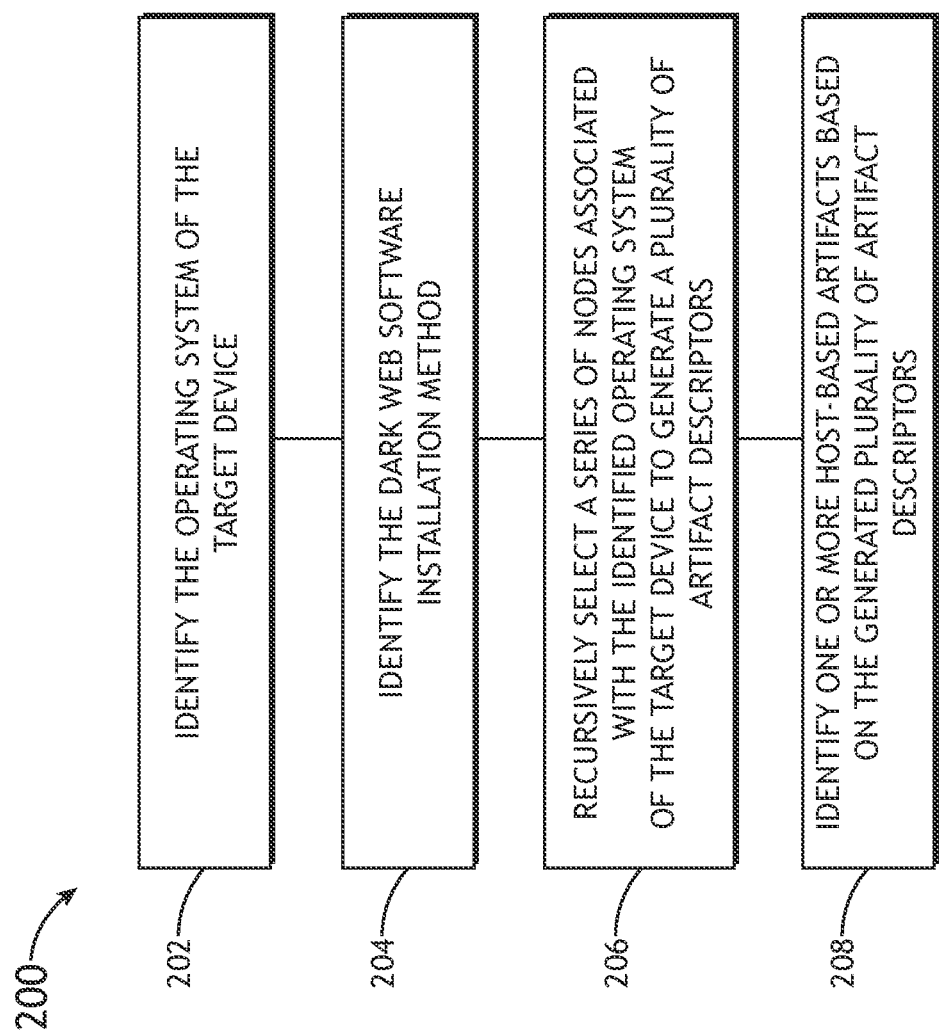
FIG. 2 illustrates a flow chart depicting a method or process of identifying host-based artifacts of dark web activity on a target device using the Dark Web Artifact Framework, in accordance with one or more embodiments of the present disclosure.

FIG. 2 illustrates a flowchart depicting a method or process 200 for identifying host-based artifacts of dark web activity on a target device using the framework 100, in accordance with one or more embodiments of the present disclosure.

Figure 3:
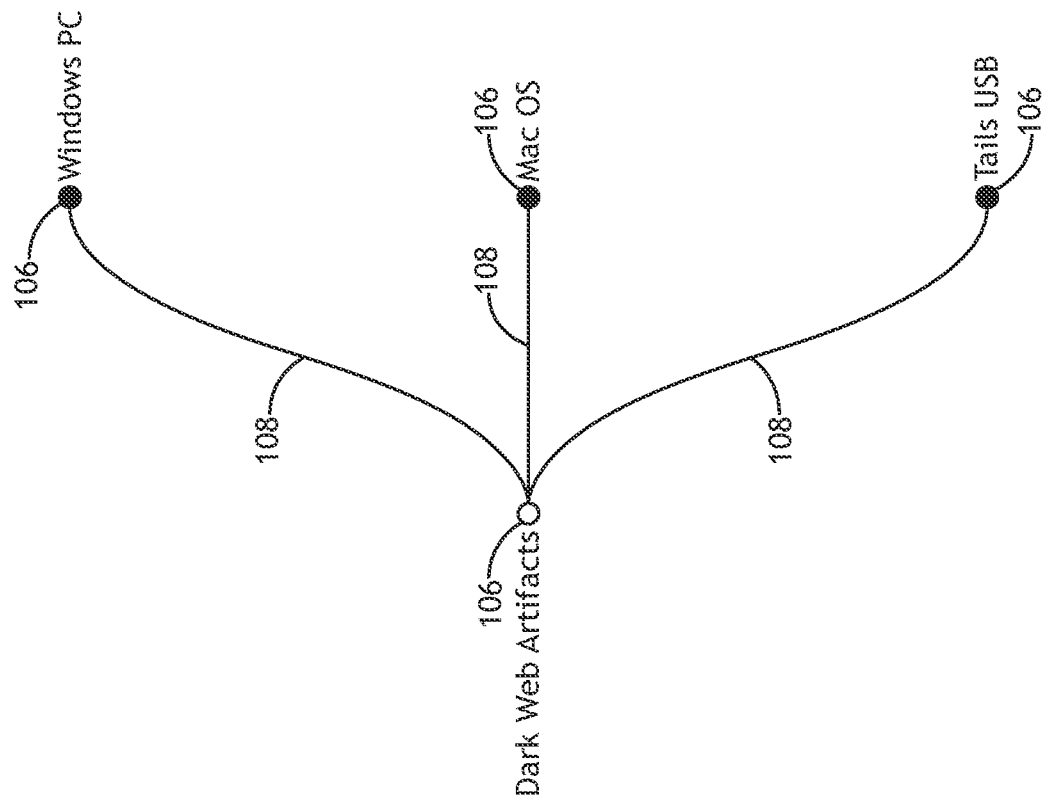
FIG. 3 illustrates a conceptual flow diagram of a portion of the Dark Web Artifact Framework, in accordance with one or more embodiments of the disclosure.

In a step 202, the operating system of the target device may be identified. For example, where the framework 100 is implemented as an interactive graphical user interface 124, a user may identify the operating system of the target device 104 using the user input device 128 of the user device 118. For instance, as shown in FIG. 3, the user may identify whether the target device 104 is associated with Windows, macOS, or Tails and select, via the user input device 128, the corresponding node on the interactive graphical user interface 124. By way of another example, where the framework 100 is implemented as an executable file on the target device 104 or the non-transitory medium 130, the one or more processors 114 of the target device 104 may identify the operating system of the target device 104. For instance, the one or more processors 114 of the target device 104 may identify whether the target device 104 is associated with Windows, macOS, or Tails. By way of another example, where the framework 100 is implemented as an executable file on the user device 118, the one or more processors 120 of the user device may identify the operating system of the target device 104. For instance, the one or more processors 120 of the user device may identify whether the target device 104 is associated with Windows, macOS, or Tails.

In a step 204, the dark web software installation method may be identified. For example, where the framework 100 is implemented as an interactive graphical user interface 124, a user may identify the dark web software installation method of the target device 104 using the user input device 128 of the user device 118. For instance, the user may identify whether the dark web software (e.g., Tor) installation method is local or via a computer readable medium (e.g., USB, SD card, or the like), and select, via the user input device 128, the corresponding node on the interactive graphical user interface 124. By way of another example, where the framework 100 is implemented as an executable file on the target device 104 or the non-transitory medium 130, the one or more processors 114 of the target device 104 may identify whether the dark web software (e.g., Tor) installation method is local or via a computer readable medium (e.g., USB, SD card, or the like). For instance, the one or more processors 114 of the target device 104 may identify whether the dark web software (e.g., Tor) installation method was/is local or via a computer readable medium (e.g., USB, SD card, or the like). By way of another example, where the framework 100 is implemented as an executable file on the user device 118, the one or more processors 120 of the user device may identify whether the dark web software (e.g., Tor) installation method was/is local or via a computer readable medium (e.g., USB, SD card, or the like). For instance, the one or more processors 120 of the user device may identify whether the dark web software (e.g., Tor) installation method was/is local or via a computer readable medium (e.g., USB, SD card, or the like.

In a step 206, a series of nodes associated with the identified operating system (in step 202) and identified installation method (in step 204) may be recursively selected. For example, where the framework 100 is implemented as an interactive graphical user interface 124, a user may recursively select one or more nodes 106, via the user input device 128, based on one or more characteristics of the target device 104. By way of another example, where the framework 100 is implemented as an executable file on the target device 104 or the non-transitory medium 130, the one or more processors 114 of the target device 104 may recursively select one or more nodes 106 based on one or more characteristics of the target device 104. By way of another example, where the framework 100 is implemented as an executable file on the user device 118, the one or more processors 120 of the user device 118 may recursively select one or more nodes 106 based on one or more characteristics of the target device 104.

In embodiments, the series of nodes 106 may be recursively selected to reveal additional branch segments until at least one end-node 110 associated with an artifact descriptor 112 is revealed, as will be discussed in further detail with respect to FIGS. 4A-6B.

In a step 208, one or more host-based artifacts may be identified based on the generated plurality of artifact descriptors. For example, the generated plurality of artifact descriptors 112 may provide the investigator with various information such as, but not limited to, file locations to inspect for various artifacts or additional actions to take on the target device 104. The plurality of artifact descriptors may be presented in various ways including, but not limited to, descriptive information associated with a potential artifact on the target device, a potential location of an artifact on the target device, a link to additional information (e.g., a hyperlink to a website including additional information), or actions required to identify or locate an artifact (e.g., utilize password-cracking software to determine a password, copy files to a different machine for processing, decrypt an image, or the like).

Figure 4A:
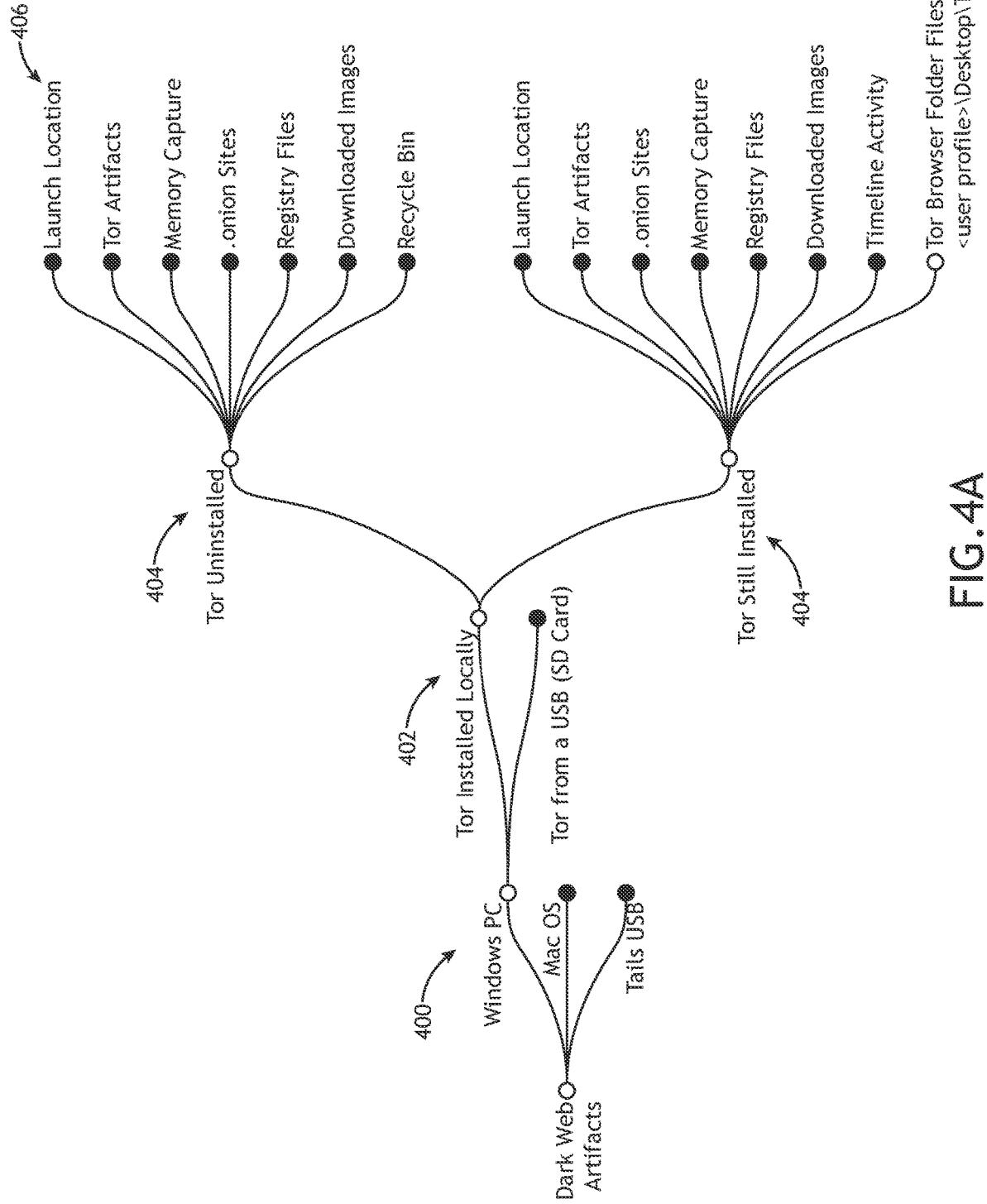
FIG. 4A illustrates a conceptual flow diagram of a portion of the Dark Web Artifact Framework associated with a Windows PC target device, in accordance with one or more embodiments of the disclosure.
Figure 4B:
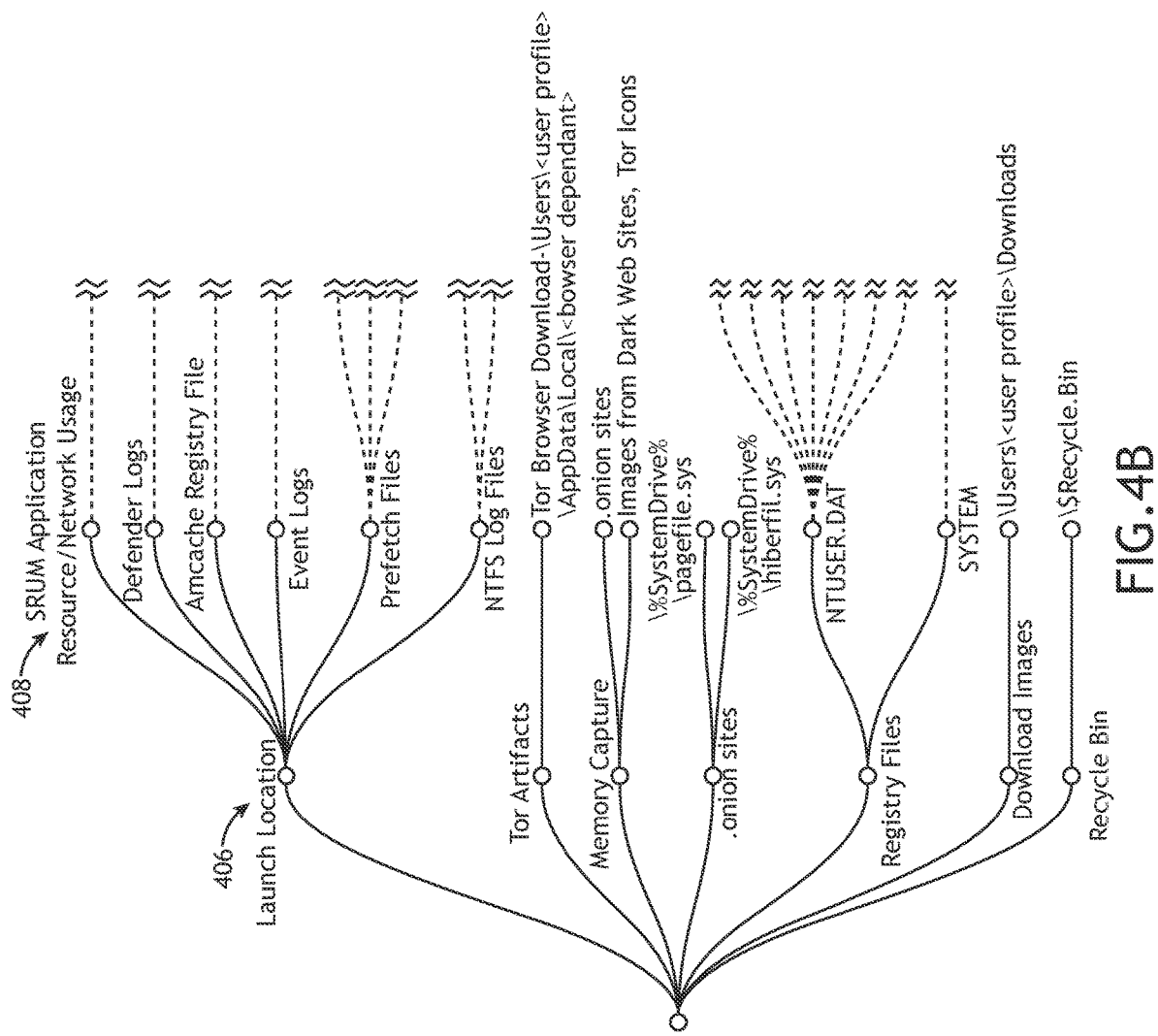
FIG. 4B illustrates a conceptual flow diagram of a portion of the Dark Web Artifact Framework associated with a Windows PC target device, in accordance with one or more embodiments of the disclosure.
Figure 4B:
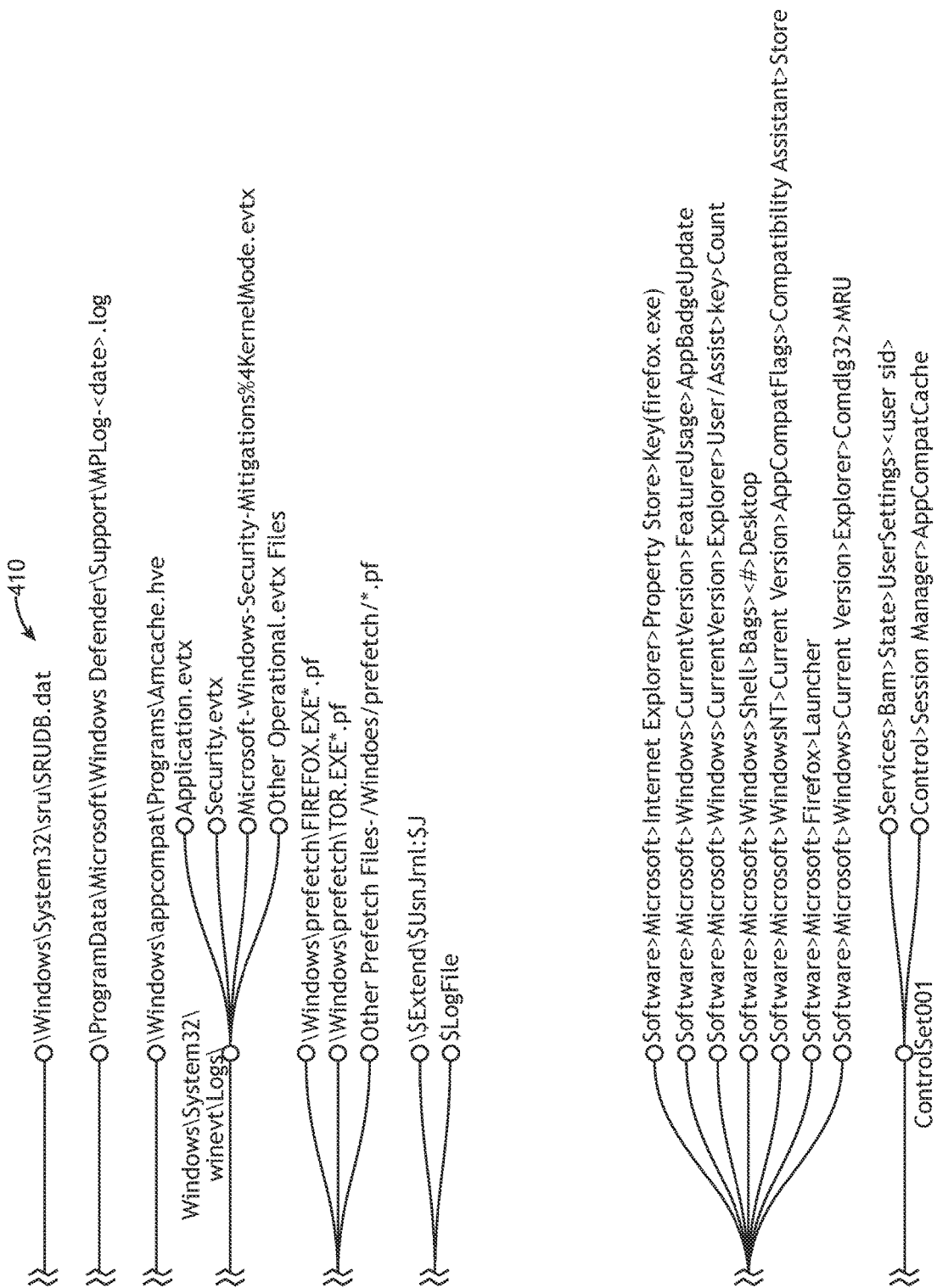
Figure 4C:
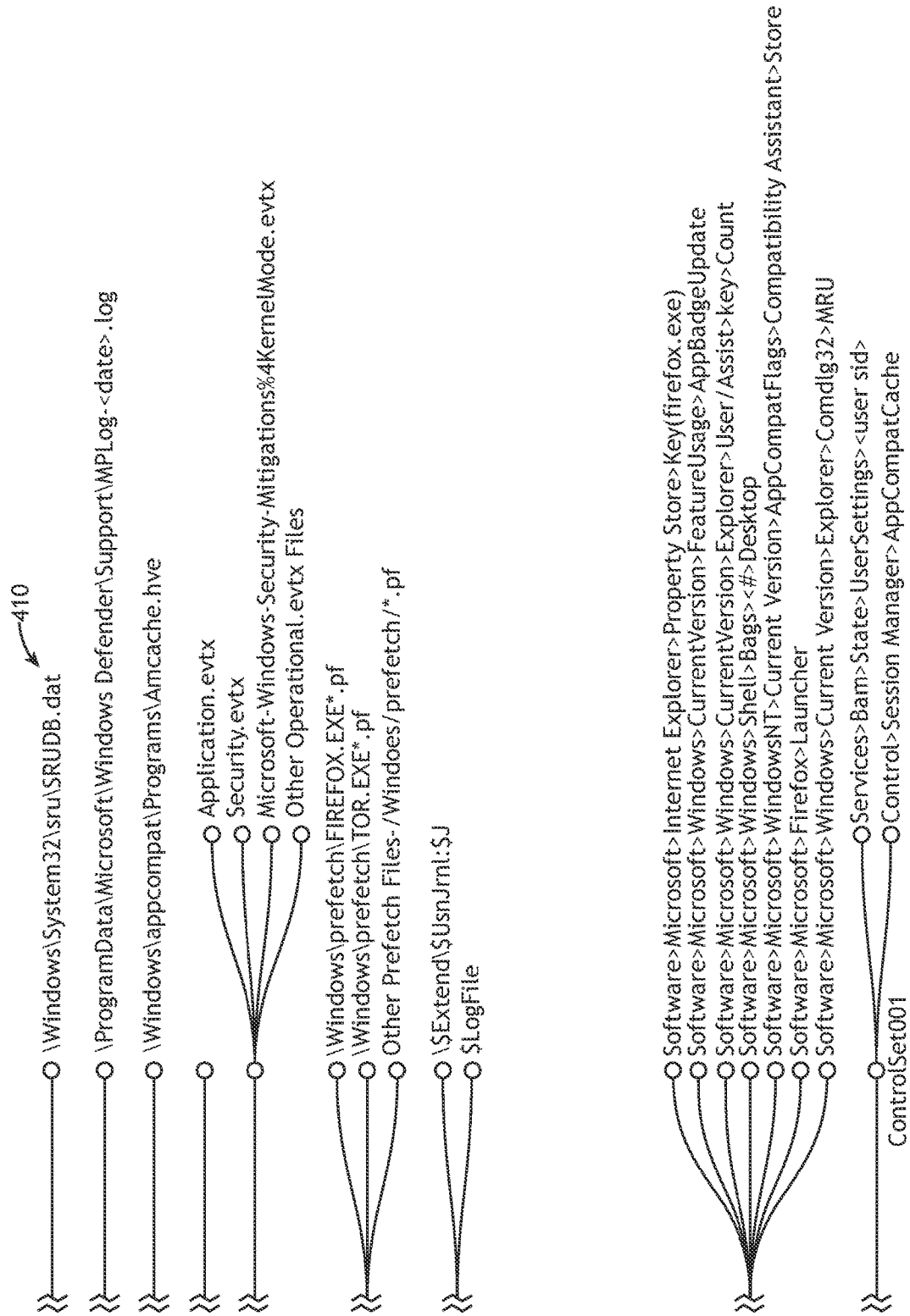
FIG. 4C illustrates a conceptual flow diagram of a portion of the Dark Web Artifact Framework associated with a Windows PC target device, in accordance with one or more embodiments of the disclosure.
Figure 4D:
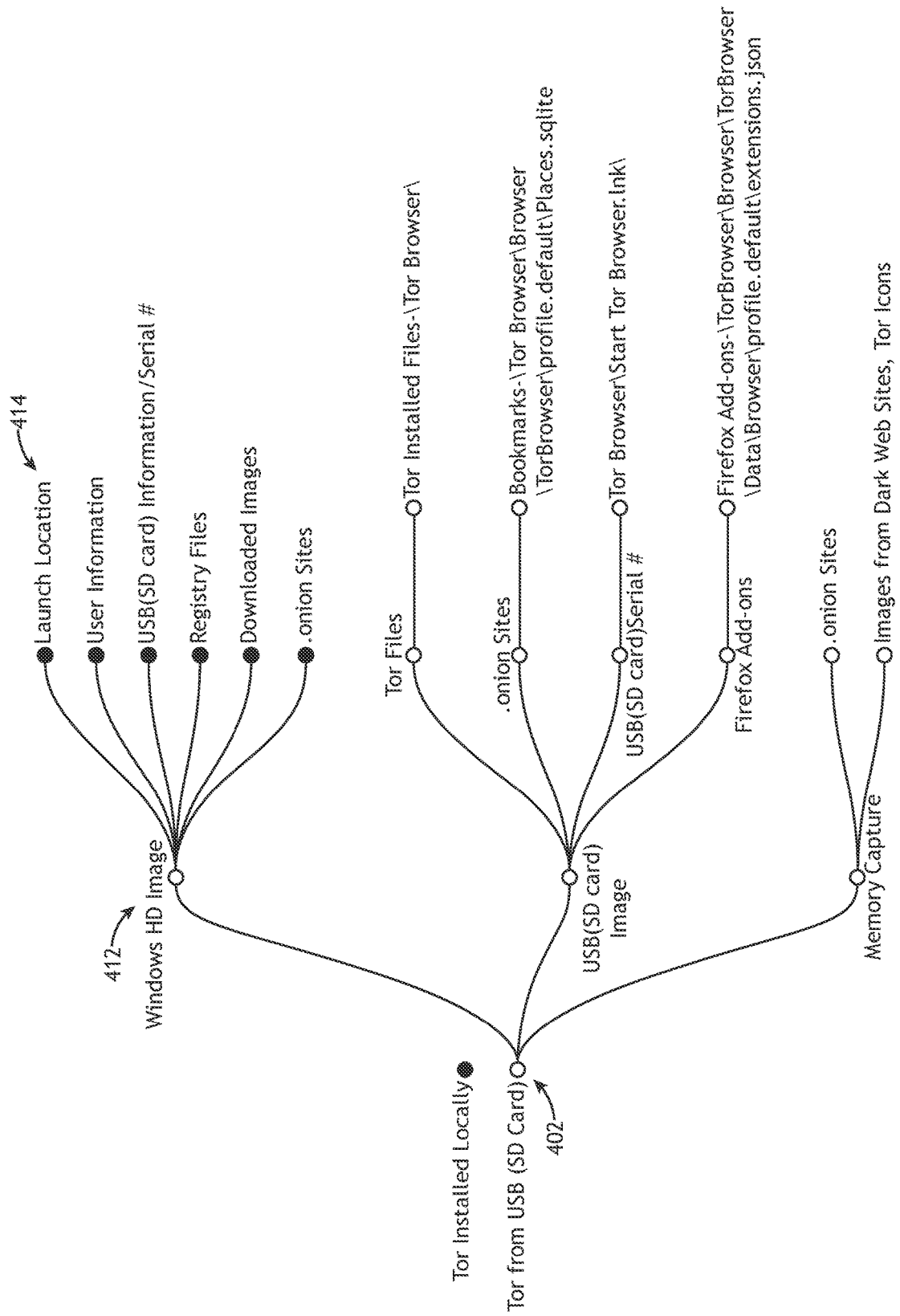
FIG. 4D illustrates a conceptual flow diagram of a portion of the Dark Web Artifact Framework associated with a Windows PC target device, in accordance with one or more embodiments of the disclosure.
Figure 4E:
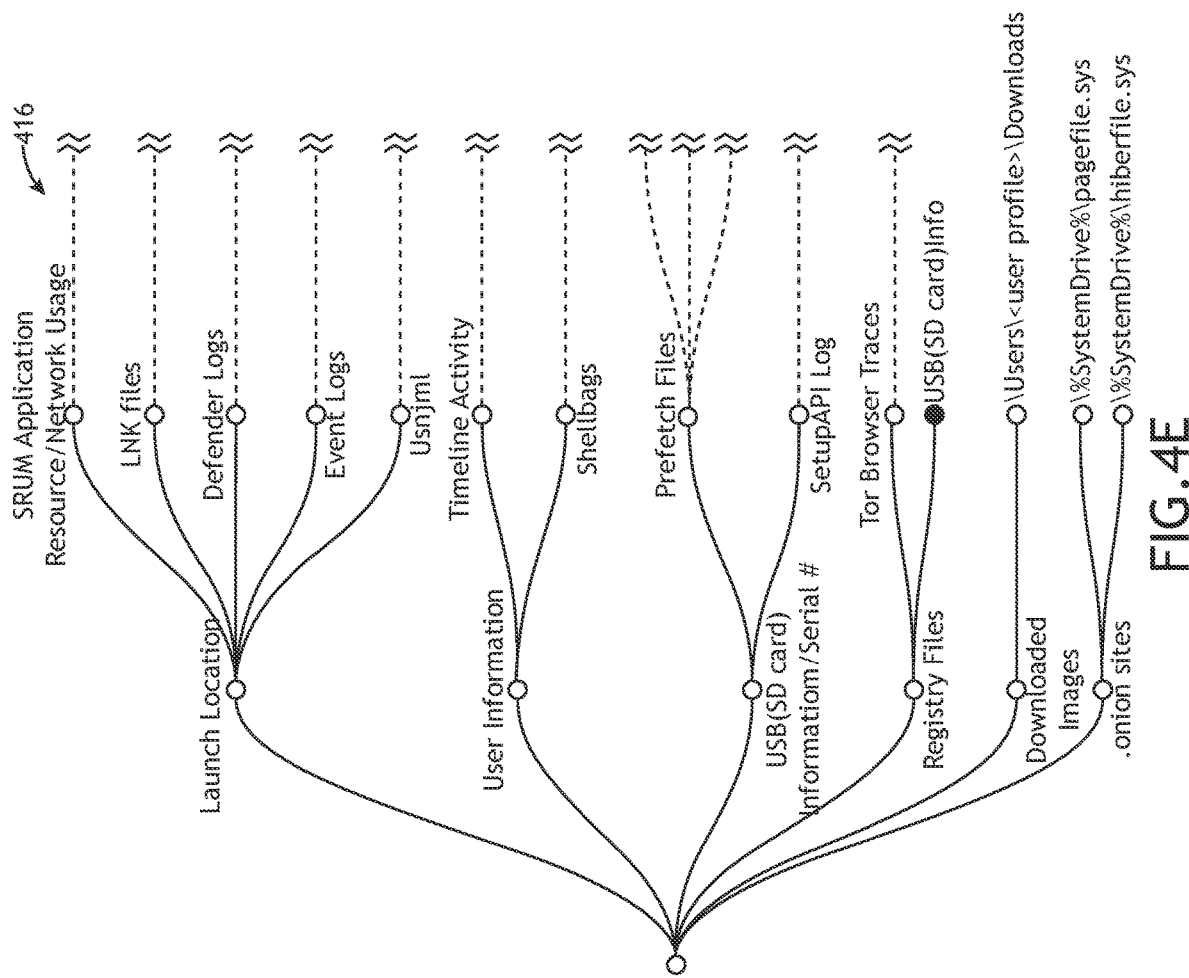
FIG. 4E illustrates a conceptual flow diagram of a portion of the Dark Web Artifact Framework associated with a Windows PC target device, in accordance with one or more embodiments of the disclosure.
Figure 4E:
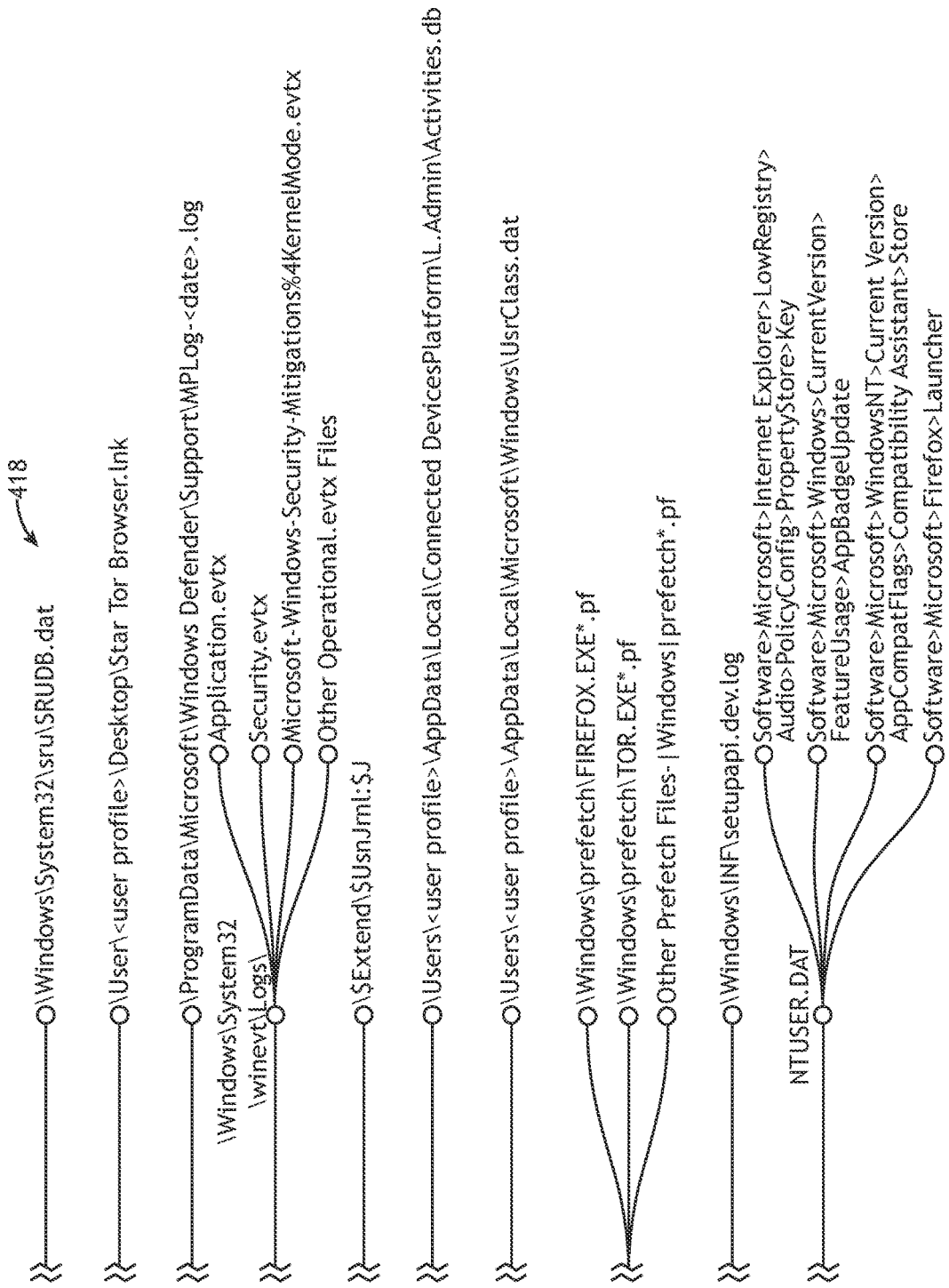
Figure 4F:
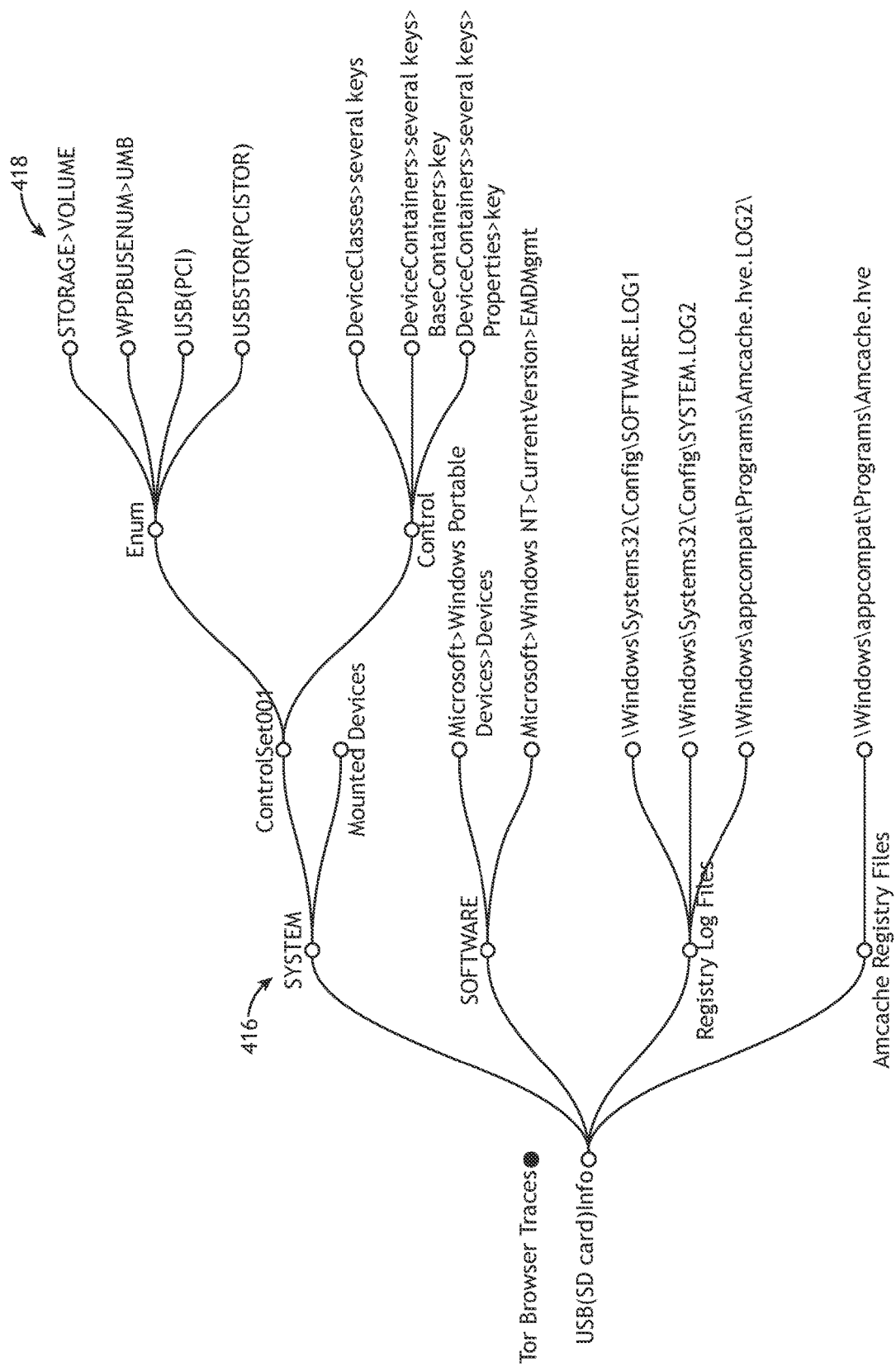
FIG. 4F illustrates a conceptual flow diagram of a portion of the Dark Web Artifact Framework associated with a Windows PC target device, in accordance with one or more embodiments of the disclosure.
Figure 5A:
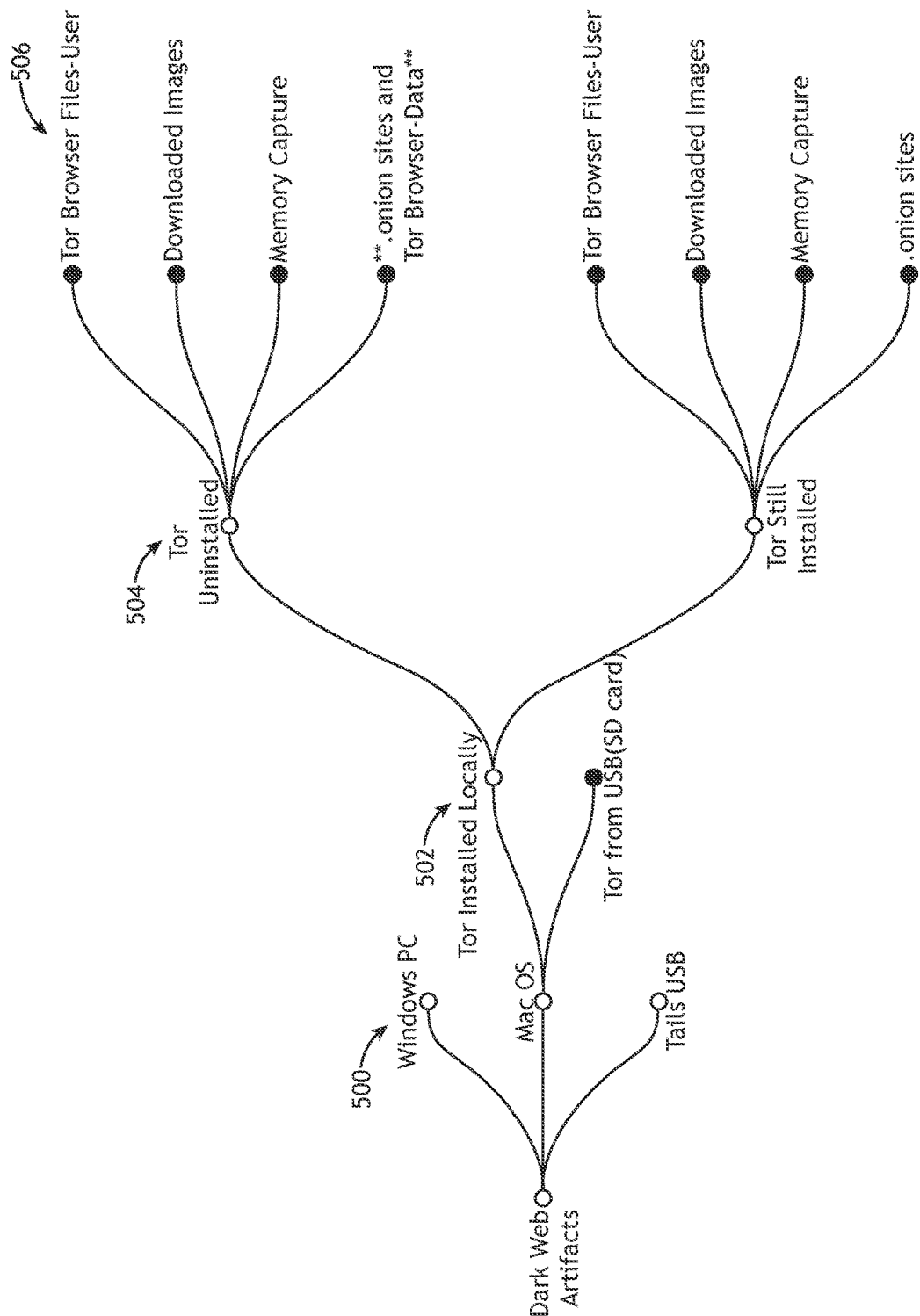
FIG. 5A illustrates a conceptual flow diagram of a portion of the Dark Web Artifact Framework associated with a macOS target device, in accordance with one or more embodiments of the disclosure.
Figure 5B:
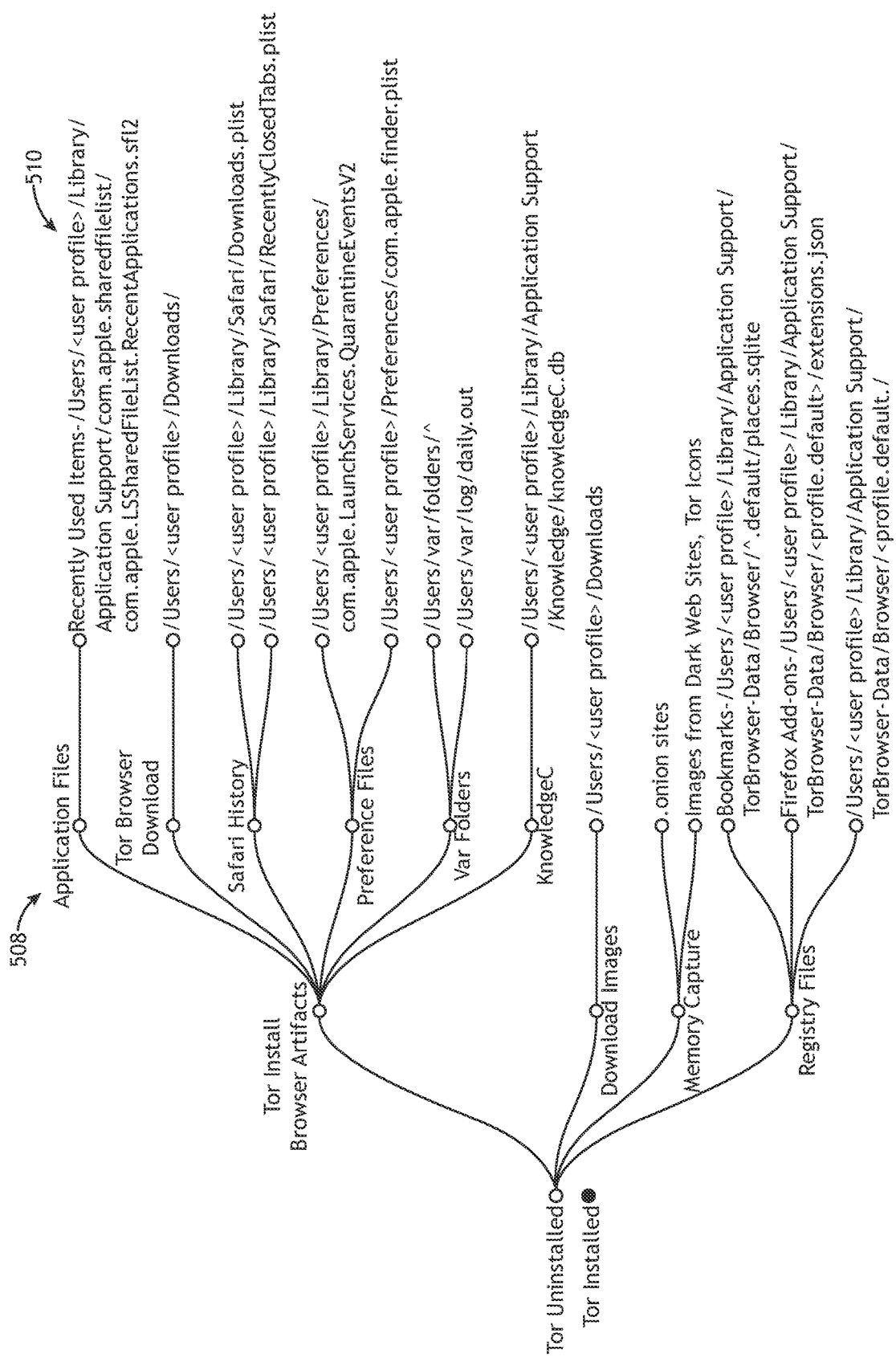
FIG. 5B illustrates a conceptual flow diagram of a portion of the Dark Web Artifact Framework associated with a macOS target device, in accordance with one or more embodiments of the disclosure.
Figure 5C:
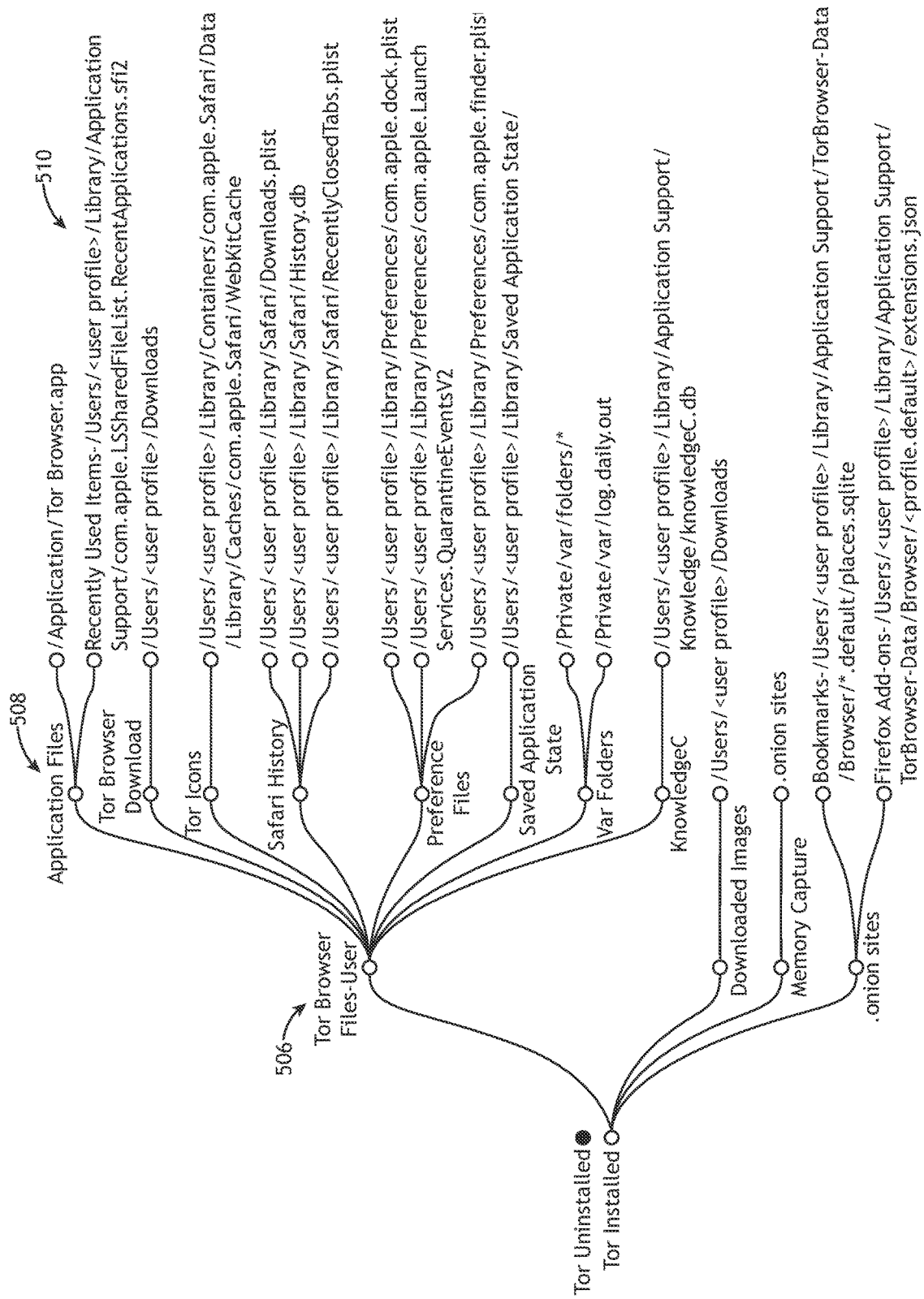
FIG. 5C illustrates a conceptual flow diagram of a portion of the Dark Web Artifact Framework associated with a macOS target device, in accordance with one or more embodiments of the disclosure.
Figure 5D:
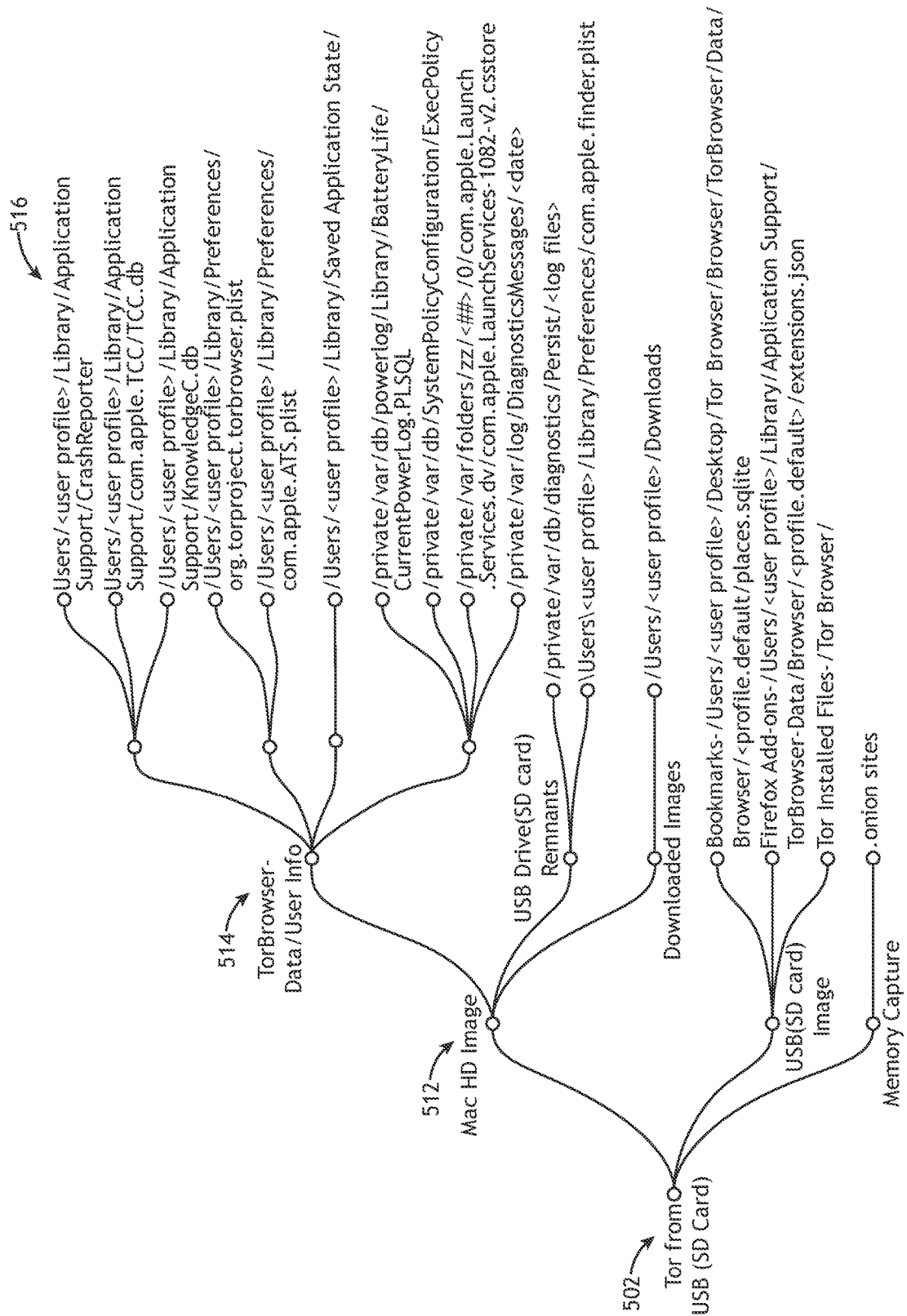
FIG. 5D illustrates a conceptual flow diagram of a portion of the Dark Web Artifact Framework associated with a macOS target device, in accordance with one or more embodiments of the disclosure.
Figure 6A:
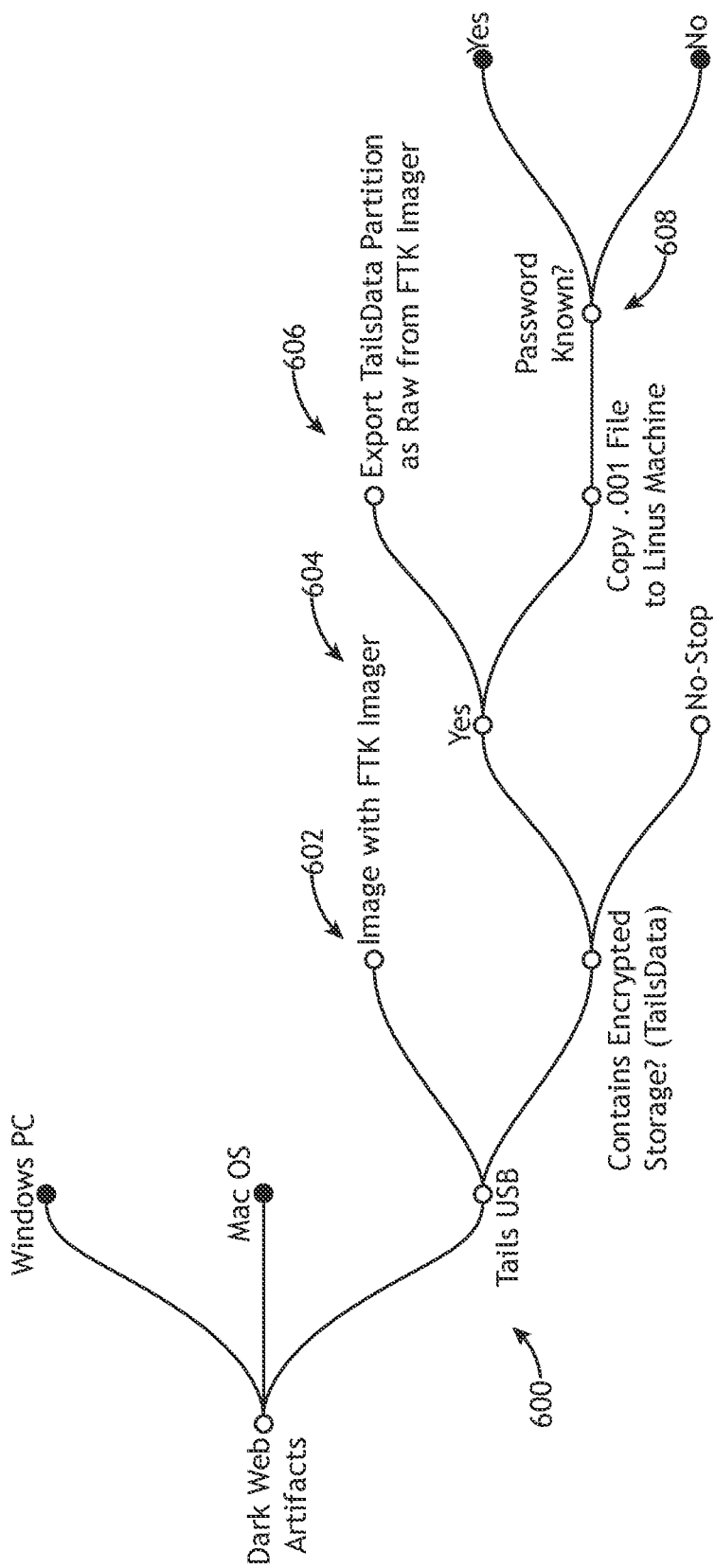
FIG. 6A illustrates a conceptual flow diagram of a portion of the Dark Web Artifact Framework associated with a Tails target device, in accordance with one or more embodiments of the disclosure.
Figure 6B:
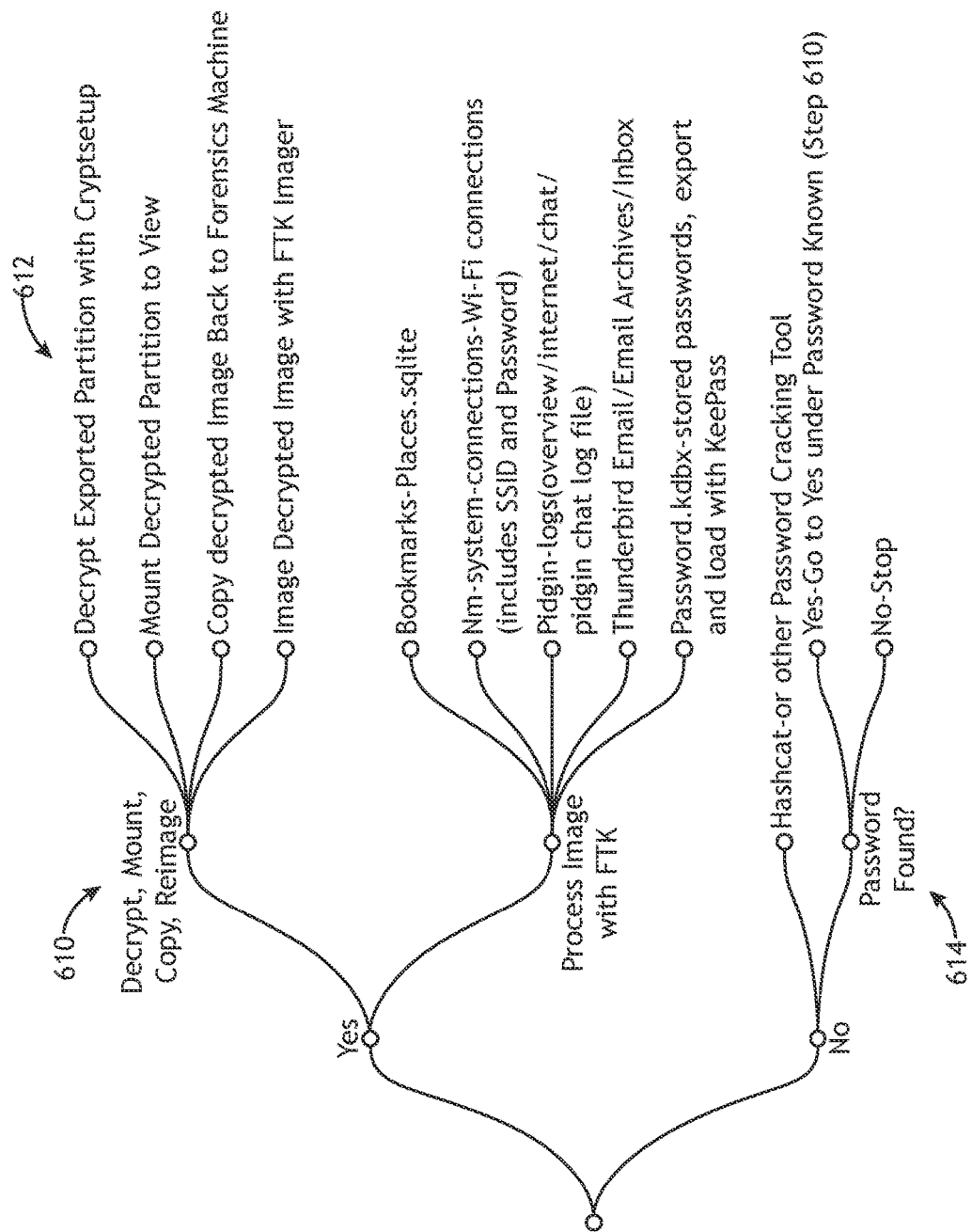
FIG. 6B illustrates a conceptual flow diagram of a portion of the Dark Web Artifact Framework associated with a Tails target device, in accordance with one or more embodiments of the disclosure.

FIGS. 4A-6B illustrate conceptual diagrams of the framework 100, in accordance with one or more embodiments of the present disclosure. In particular, FIGS. 4A-4F depict a conceptual diagram of a method or process 400 for identifying one or more host-based artifacts on a target device 104 with a Windows operating system, in accordance with one or more embodiments of the present disclosure. In particular, FIGS. 5A-5D depict a conceptual diagram of a method or process 500 for identifying one or more host-based artifacts on a target device 104 with a macOS operating system, in accordance with one or more embodiments of the present disclosure. In particular, FIGS. 6A-6B depict a conceptual diagram of a method or process 600 for identifying one or more host-based artifacts on a target device 104 with a Tails operating system, in accordance with one or more embodiments of the present disclosure. For purposes of simplicity and clarify, portions of the framework 100 depicted in FIGS. 4A-6B are unexpanded.

It is to be understood that FIGS. 4-35 and the associated descriptions are provided solely for illustrative purposes and should not be interpreted as limiting. Rather, a Framework 100 as disclosed herein may generally provide artifact descriptors 112 associated with artifacts from any dark web software on any operating system.

Generally, when opening the framework 100, expanded nodes 106 are illustrated as open circles and contracted nodes 106 are illustrated as closed circles. The initial node 106 provides a selection of the operating system from which Tor was potentially executed. Starting with each operating system, the branching begins with a decision of whether Tor was installed locally or from a USB or secure digital (SD) card. If Tor was installed locally, the next branching provides options for whether Tor is still installed or has been deleted from the system. The Tails branch provides steps for an investigator to follow to first determine whether or not there is persistent storage on the imaged Tails drive. If persistent storage exists, steps are provided for attempting to decrypt and reimage to identify artifacts that the user saved.

Referring to FIGS. 4A-4F, where the operating system is identified as Windows, the framework 100 may include a series of nodes 106, branch segments 108, and end-nodes 110 associated with identifying host-based artifacts on target devices 104 operating on Windows.

Once the Windows PC node 106 has been selected (by a user or processor), in a step 402, a selection of the location from which the dark web software is executed may be provided For example, the location may include, but is not limited to, local to the target device 104 or from an external device (e.g., a USB drive, a SD card, or the like).

In a step 404, in some embodiments, if location is local, a selection of whether the dark web software is installed or uninstalled from the target device 104 may be provided.

In a step 406, in some embodiments, a selection of artifact classes may be provided. For example, as shown in FIG. 4A, classes of artifacts generated by the use of Tor installed locally and uninstalled on a Windows operating system may include, but are not limited to, launch location artifacts, Tor artifacts, memory capture artifacts, onion sites, Registry files, downloaded images, or Recycle Bin files. By way of another example, as shown in FIG. 4A, classes of artifacts generated by the use of Tor installed locally and still installed on a Windows operating system may include, but are not limited to, launch location artifacts, Tor artifacts, memory capture artifacts, onion sites, Registry files, downloaded images, timeline activity, or Tor Browser Folder files.

In a step 408, in some embodiments, a selection of artifact sub-classes may be provided. For example, as shown in FIG. 4B, sub-classes of artifacts generated by the use of Tor installed locally on a Windows operating system may include, but are not limited to, SRUM application resource/ network usage data, defender logs, registry files, event logs, prefetch files, log files, .onion sites, file locations, and the like.

Referring to FIG. 4C, in a step 410, in some embodiments, one or more artifact descriptors associated with the selected artifact classes and/or selected sub-classes may be generated.

Referring to FIG. 4D, in a step 412, in some embodiments, if location is USB (or SD card), a selection of file locations on the USB (or SD card) are provided. For example, the locations may include, but are not limited to, Windows HD image, USB (or SD card) image, or memory capture.

In a step 414, in some embodiments, a selection of artifact classes may be provided. For example, as shown in FIG. 4E, classes of artifacts generated by the use of Tor installed from USB (or SD card) on a Windows operating system may include, but are not limited to, launch location artifacts, user information, USB (or SD card) information/serial number, .onion sites, Registry files, downloaded images, Tor files, and Firefox Add-ons.

In a step 416, in some embodiments, a selection of artifact sub-classes may be provided. For example, sub-classes of artifacts generated by the use of Tor installed from USB (or SD card) a Windows operating system may include, but are not limited to, SRUM application resource/network usage data, defender logs, registry files, event logs, prefetch files, log files, .onion sites, file locations, and the like.

In a step 418, in some embodiments, one or more artifact descriptors associated with the selected artifact classes and/ or selected sub-classes may be generated.

Referring to FIGS. 5A-5D, where the operating system is identified as macOS, the framework 100 may include a series of nodes 106, branch segments 108, and end-nodes 110 associated with identifying host-based artifacts on target devices 104 operating on macOS.

Once the macOS node has been selected (by a user or processor), in a step 502, a selection of the location from which the dark web software is executed may be provided. For example, the location may include, but is not limited to, local to the target device 104 or from an external device (e.g., a USB drive, a SD card, or the like).

In a step 504, in some embodiments, a selection of whether the dark web software is installed or uninstalled from the target device 104 may be provided.

In a step 506, in some embodiments, a selection of artifact classes may be provided. For example, classes of artifacts generated by the use of Tor installed locally or uninstalled on a macOS operating system may include, but are not limited to, user-associated Tor Browser files, downloaded images, memory capture artifacts, .onion sites, bookmarks, or browser add-ons.

In a step 508, in some embodiments, a selection of artifact sub-classes may be provided. For example, sub-classes of artifacts generated by the use of Tor installed locally or uninstalled on a macOS operating system may include, but are not limited to, application files, browser download files, safari history files, preference files, Var folders, KnowledgeC files, and the like.

In a step 510, in some embodiments, one or more artifact descriptors associated with the selected artifact classes and/ or selected sub-classes may be generated.

Referring to FIG. 5D, in a step 512, in some embodiments, if location is USB (or SD card), a selection of file locations on the USB (or SD card) are provided. For example, the locations may include, but are not limited to, Mac HD image, USB (or SD card) image, or memory capture.

In a step 514, in some embodiments, a selection of artifact classes may be provided. For example, classes of artifacts generated by the use of Tor installed from a USB (or SD card) may include, but are not limited to, user-associated Tor Browser files, USB drive (or SD card) remnants, downloaded images, memory capture artifacts, or USB (or SD card) images.

In a step 516, in some embodiments, one or more artifact descriptors associated with the selected artifact classes and/ or selected sub-classes may be generated.

Referring to FIGS. 6A-6B, where the operating system is identified as Tails, the framework 100 may include a series of nodes 106, branch segments 108, and end-nodes 110 associated with identifying host-based artifacts on target devices 104 operating on Tails.

Once the Tails node has been selected (by a user or processor), in some embodiments, a series of forensic choices may be received related to a target device 104 operating on Tails.

In a step 602, in some embodiments, a selection of whether there is an image with FTK image is received.

In a step 604, in some embodiments, a selection of whether the target device includes encrypted storage is received. If no, there are no further steps. If yes, proceed to step 606.

In a step 606, in some embodiments, one or more actions may be generated. For example, an action may be generated for exporting tails data partition as raw data from FTK imager. By way of another example, an action may be generated to copy 0.001 file to Linus machine.

In a step 608, in some embodiments, a selection of whether the password is known is received.

In a step 610, in some embodiments, if the password is known, one or more actions may be generated. For example, an action may be generated for decrypting, mounting, copying, or reimaging the image drive. By way of another example, an action may be generated for processing image with FTK.

In a step 612, in some embodiments, one or more artifact descriptors associated may be generated based on the actions in step 610.

If no, in a step 614, in some embodiments, an attempted password recovery tool may be used to identify the password. For example, a password cracking tool such as, but not limited to, Hashcat, may be used to identify the password. If the password has been identified, then proceed to step 610. If the tool was unsuccessful, then there are no further steps.

The artifacts 102 provided by this framework 100 are associated with default preferences for security and privacy in Tor. It is noted that users have the option to use a master password which enables saving logins and passwords, site history can be remembered, and the security level can be changed to a different level. Such actions may impact the number or types of artifacts 102 on the target device 104, but are not presented in this particular example.

The artifacts 102 listed in the framework 100 may not always be found on the target device 104 and there may be additional artifacts 102 that are not included in this particular illustration of the framework 100. The artifacts 102 associated with this framework 100 are associated with various means of executing Tor on the target device 104 including local installation on Windows and macOS operating systems, execution from a USB drive mounted to Windows and macOS operating systems, and execution from Tails booted from a USB drive mounted to Windows and macOS operating systems. Further, some artifact descriptors 112 are associated with cases in which Tor is installed locally on the target device 104 and cases in which Tor is installed locally and subsequently deleted.

A detailed discussion of the steps of the framework 100 is provided below in relations to FIGS. 4A-6B.

Tor Installed Locally

The Tor Browser is available to be installed on different platforms and in 32 different languages. Tor is available for Windows, OS X, Linux, and Android ("Tor Project," n.d.). The Tor Project website indicates the safest way to download the Tor Browser is directly from their website, however they acknowledge it may not always be accessible if it is blocked by the network of the user. Other alternatives include mirror sites or GetTor. GetTor is a service that automatically responds to user requests for a link to download the Tor Browser from hosted locations such as Drop-Box, Google Drive, and GitHub. GetTor can also provide the Tor Browser via email or via Jabber. On a Windows system, the downloaded file is an .exe file, on macOS it is a .dmg file. Launching the downloaded file initiates the install just as other software is installed. The user has the option to change the default install location, however the artifact descriptors 112 here are associated with default options.

Windows Local Install

Installing Tor onto a Windows computer places the Tor Browser onto the Windows desktop which puts the files in the/Users/<user profile>/Desktop/file path. This local install of the Tor Browser also leaves artifacts 102 in many other locations. FIG. 4C is a diagram of the Framework 100 illustrating branching associated with Tor installed locally on Windows while still installed on the target device 104, in accordance with one or more embodiments of the present disclosure.

Launch Location

In addition to the location of the Tor Browser install files which contains the executable, LNK files and other files needed to run Tor, there are several artifacts 102 showing the launch location of Tor including:
 SRUM Application Resource/Network Usage—SRUDB-.dat
 Windows Defender logs—MPLog*.log
 Amcache Registry hive files—Amcache.hve
 Event logs—Application.evtx, Security.evtx, Microsoft-Windows-Security-Mitigations%4KernelMode.evtx, and other .evtx files
 Prefetch Files—firefox.exe*.pf, tor.exe*.pf, svchost.exe*.pf, and other prefetch files
 UsnJrnl—a journal file used in Windows New Technology File System (NTFS)
 $LogFile—NTFS logging file Tor Install Browser Artifacts The Tor Project URL with the Tor executable file indicating that the Tor Browser was downloaded is found and is dependent on the browser used. For Internet Explorer and older versions of Edge it will be in WebCacheV01.dat file, for Chrome and newer versions of Edge it will be found in an SQLite History file within the Edge/Default folder.

.onion Sites

Artifacts remain for onion sites that were bookmarked or add-ons that were installed for .onion sites. Places.sqlite contains Tor bookmarks with titles stored in the MOZ_BOOKMARKS table and the corresponding .onion site is stored in both the MOZ_ORIGINS table and MOZ_PLACES table. The artifacts 102 left behind in the places.sqlite file are dependent on whether or not the user creates a bookmark for a site. Users who are knowledgeable or cautious may not bookmark sites in Tor, leaving no artifacts behind in places.sqlite. Add-ons are found in the extensions.json file found in the Tor Browser install location. Like bookmarks, if users do not install any add-ons there will be no artifacts 102 from dark web sites in the extensions.json file.

Memory Capture

A capture of system memory either while the target device 104 is still running after having accessed the dark web, or after a restart, reveals artifacts 102 of .onion sites, images from dark web sites, and LNK files indicating where the Tor Browser was launched from. Capturing memory after the target device 104 has been used to access the dark web, but prior to a restart, contains the most artifacts 102. Restarting or shutting down the target device 104 removes the artifacts 102 that are left in volatile memory; however, artifacts 102 may remain in the pagefile.sys or hibefil.sys files. The artifacts 102 that can be found include onion site names, images from dark web sites visited such as marketplaces, and Tor Browser icons. URLs to dark web sites are generally not obvious in determining whether the site that was visited is nefarious. To aid in determining what sites have been accessed, using Magnet AXIOM forensic software or another forensics tool, a report can be created by exporting the evidence found in either a comma-separated value (CSV) file or an Excel spreadsheet file for further searching to determine the site contents.

Registry Files

There are multiple locations in the Windows Registry that contain artifacts 102 from Tor Browser. These are addressed in an upcoming question specific to the Windows Registry.

Downloaded Images

Images that are downloaded from sites while using the Tor Browser are saved to the user's Download folder.

Windows Timeline Activity

The ActivitiesCache.db file contains the URL of the Tor Project download site along with the location the Tor Browser install executable file that was downloaded which can indicate which user downloaded the file.

macOS Local Install

Installing the Tor Browser on macOS requires downloading the .dmg file. Once launched, Tor Brower is installed when the user drags it to the Applications folder or other location. FIG. 5C is a diagram of the framework 100 illustrating macOS Tor Installed Local Artifacts, in accordance with one or more embodiments of the present disclosure.

Tor Browser Files—User

In addition to the Tor Browser application files that are installed, files that are installed when a user installs and runs the Tor Browser can be found under that user in numerous artifacts 102. FIG. 5D is a diagram of the framework 100 illustrating macOS Tor Browser User Files Artifacts, in accordance with one or more embodiments of the present disclosure.

Tor Browser Download macOS contains an Application Support folder for users that contains support files for running an application. For the Tor Browser, the TorBrowser-Data folder is created and contains the supporting files for running the Tor Browser.

Tor Icons

Images from the Tor Project website can be found in the WebKitCache folder for the user who installed the Tor Browser.

Safari History

Safari history is located in the user's \Library\Safari folder and includes files that contain links to the Tor Project website. The Downloads.plist file for the user contains the URL of the TorBrowser.dmg file and includes the date and time the file was downloaded. History.db contains a link to the Tor Project site including the download folder. RecentlyClosedTabs.plist also contains a link to the Tor Project website thank-you page.

Preference Files

Tor Browser information is found in .plist and other files in the LibraryPreferences folder including dock items in the com.apple.dock.plist, quarantined files in com.apple.LaunchServices.QuarantineEventsV2, and volume and device identifier information in com.apple.finder.plist.

Saved Application State

The Saved Application State is a macOS feature that saves the open screens of an application when the application is terminated. The user profile \Library\ folder contains an entry for org.torproject.torbrowser.savedState.

Var Folders

The \private\var\ contains both file system event files and daily log file with Tor Browser artifacts. The daily log file, daily.out, contains disk usage and network information. The file system events files provide file and folder modification and creation information and contains several references to the Tor Browser.

KnowledgeC

The knowledgeC.db file contains an event log of processes that run within an Apple device. The ZOBJECT table within knowledgeC.db contains a type called App/InFocus that shows the date and time an application is being used.

.onion Sites

Some artifacts 102 may remain for .onion sites that were bookmarked or add-ons that were installed for .onion sites on a target device 104 running macOS as they are on a target device 104 running Windows. places.sqlite contains Tor bookmarks with titles stored in the MOZ_BOOKMARKS table and the corresponding .onion site is stored in both the MOZ_ORIGINS table and MOZ_PLACES table. The artifacts 102 left behind in the places.sqlite file are dependent on whether or not the user bookmarks sites. Users who are knowledgeable or cautious may not bookmark sites in Tor leaving no artifacts 102 behind in places.sqlite. Add-ons are found in the extensions.json file found in the Tor Browser install location. Like bookmarks, if users do not install any add-ons there will be no artifacts 102 from dark web sites in the extensions.json file.

Downloaded Images

As they are on a target device 104 running Windows, images that are downloaded on a computer running macOS from sites while using the Tor Browser are saved to the user's Downloads folder.

Memory Capture

A memory capture of a target device 104 running macOS that has used Tor to access the dark web is similar to a target device 104 running Windows. macOS does not contain the pagefile.sys file like Windows but does contain a swap file. Artifacts such as .onion addresses, Tor icons, and images from dark web sites are all found.

Launching Tor from Removable Media

Installing Tor onto a removable drive such as a USB drive or SD card places the Tor Browser install files onto the USB drive or SD card rather than the local hard drive of the target device 104 that Tor is launched from. Users may incorrectly think that doing this leaves no artifacts 102; however, that is not accurate. Launching Tor from a USB drive or SD card leaves artifacts 102 on the target device 104 and on the USB drive or SD card.

Windows—Tor Run from USB

Many of the same artifacts 102 that are found when Tor is installed locally are found when Tor is launched from a USB drive or SD card such as the launch location, user information, and downloaded images. Additionally, information about the USB drive or SD card that launched Tor can be identified and matched to the USB drive or SD card if it is also located. FIG. 4F is a diagram of the Framework 100 illustrating Windows Tor from USB (SD Card) information, in accordance with one or more embodiments of the present disclosure.

Artifacts Found on Windows Hard Drive

Launch Location

The location Tor was launched from is found in multiple artifacts 102 similar to Tor being installed locally on the hard drive. This is significant when running Tor from a USB drive or SD card as there will not be an installed program on the hard drive, it can be clearly shown where Tor was launched from. FIG. 4F is a diagram of the Framework 100 illustrating Windows Tor from USB (SD card) Launch Location Artifacts, in accordance with one or more embodiments of the present disclosure.

The launch location of Tor is found in the following:
SRUM Application Resource/Network Usage—SRUDB.dat
Windows Defender logs—MPLog*.log
Event logs—Security.evtx and Microsoft-Windows-Security-Mitigations%4KernelMode.evtx
UsnJrnl—a journal file used in Windows New Technology File System (NTFS)

User Information

The Windows timeline activity file ActivitiesCache.db contains information on the user that launched Tor. This file also shows the location Tor was launched from so could also be included in the launch location section of the framework, however, to avoid redundancy it is included in this user information section. The Windows Shellbags file, usrclass.dat, also indicates which user launched Tor. FIG. 4F is a diagram of the Framework 100 illustrating Windows Tor from USB (SD card) User Information Artifacts, in accordance with one or more embodiments of the present disclosure.

USB (SD Card) Information

Information about the USB or SD card that was used to launch Tor including the make, model, and serial number is found in the Windows Prefetch files for TOR.EXE, FIREFOX.EXE, and may be found in other prefetch files such as SVCHOST.EXE. The Windows compatibility appraiser also contains USB or SD card make and model information. FIG. 4F is a diagram of the framework 100 illustrating Windows Tor from USB (SD card) USB Information, in accordance with one or more embodiments of the present disclosure.

Registry Files

There are multiple locations in the Windows Registry that contain artifacts 102 from Tor Browser. These are addressed in an upcoming question specific to the Windows Registry.

Downloaded Images

The default for images that are downloaded from sites while using the Tor Browser when launched from a USB drive or SD card is the user's Download folder rather than to the USB drive or SD card.

Artifacts Found on USB Drive or SD Card

If the USB drive or SD card is located, it can be shown through the artifacts 102 on the target device 104 and the USB drive or SD card that it had previously been used to launch the Tor Browser. FIG. 4F is a diagram of the Framework 100 illustrating Windows Tor from USB (SD card)-USB (SD card) Artifacts, in accordance with one or more embodiments of the present disclosure.

The artifacts found on the USB drive or SD card include the following:
- Tor Files—the Tor Browser installation files
- .onion sites—places.sqlite file contains bookmarked sites
- USB serial #—the 'Start Tor Browser.lnk' file contains the serial number of the
- USB drive
- Firefox Add-ons—extensions.json file contains any add-ons the user has installed Memory Capture A memory capture of a target device 104 that has run Tor from a USB drive or SD card is similar to installing and launching Tor locally. Capturing the memory after the target device 104 has been used to access the dark web but prior to a restart contains the most artifacts 102. A capture of system memory either while the target device 104 is still running after having accessed the dark web or after a restart reveals artifacts 102 of .onion sites, images from dark web sites, and LNK files indicating where the Tor Browser was launched from.

macOS Tor Run from USB or SD Card

Similar to launching Tor from a USB or SD card when using Windows, launching Tor from a USB while running macOS leaves artifacts 102 on the hard drive, the USB drive, and in system memory. FIG. 13 is a diagram of the Framework 100 illustrating macOS Tor from USB (SD card) information, in accordance with one or more embodiments of the present disclosure.

Artifacts Found on macOS Hard Drive

The artifacts 102 found on the macOS hard drive including artifacts 102 connected to the Tor Browser, artifacts 102 containing information related to the USB drive used to launch of Tor, and downloaded images. FIG. 5D is a diagram of the framework 100 illustrating macOS Tor from USB (SD card) HD Image information, in accordance with one or more embodiments of the present disclosure.

Tor Browser Data/User Info

Running Tor from a USB drive or SD card still places files for running Tor Browser in the Application Support folder like it does when installing Tor locally. The Application Support folder resides within the user profile indicating the user that launched Tor Browser. Some artifacts 102 also remain for preference files, the saved application state, and var folders when launched from a USB or SD card as they do when installed locally. FIG. 5D is a diagram of the Framework 100 illustrating macOS Tor from USB (SD Card) HD TorBrowser-Data/User Information, in accordance with one or more embodiments of the present disclosure.

USB Drive or SD Card

Information about the USB drive or SD card used to launch Tor Browser can be found in the CurrentPowerlog.PLSQL file, specifically the PLPeripheralAgent_EventForward_DeviceState table.

Additional Artifacts 102 Associated with Obfuscation Techniques

Using Tor itself is an obfuscation technique, however users who are using Tor with criminal intent may seek further methods of ensuring their activities are hidden. As stated previously herein, Tor can be run from both a USB drive or SD card inserted into the target device 104, locally installed onto the hard drive of the machine being used, or as part of a bootable operating system. Users may incorrectly assume that by running Tor from a USB drive or SD card that their system is safe since they are not installing to the local drive. Any of these methods can leave behind artifacts either on the target device 104 or on the method used such as a USB drive, SD card or the drive used to run Tails.

Users who install Tor locally on their system may delete Tor. The directions for removing Tor from a system can be located in the Tor Browser manual found on the Tor Project website. These directions call for the user of a Windows system to simply delete the folder or application and empty the trash. On a macOS system the directions are similar, move the application to Trash, then locate the ~/Application Support/folder, look for TorBrowser-Data folder, move it to Trash, then empty the trash. The website notes that the operating system's standard "uninstall" utility is not used. Users who are rushed or do not fully complete either of these instructions can miss the step of emptying the trash or deleting the TorBrowser-Data folder, so such artifacts 102 in both the Application Support folder on macOS and the Recycle Bin on a Windows machine were incorporated into this illustrative framework 100.

Windows Local Install—Tor Deleted

Uninstalling Tor from a Windows system by following the recommendation on the Tor Project website removes the Tor.exe executable file, places.sqlite, extensions.json file, and other files contained within the TorBrowser folder but most of the other artifacts 102 remain. FIG. 4B-4C is a diagram of the Framework 100 illustrating Windows Local Tor Deleted Launch Location Information, in accordance with one or more embodiments of the present disclosure. If the system has not been shut down, a memory capture may still contain .onion sites, Tor Browser icons, and images of dark web sites. A user who wants to remove any trace of having downloaded, installed, and launched Tor will need to take extra steps beyond the recommendations.

macOS Local Install—Tor Deleted

The instructions on the Tor website for removing the Tor Browser from a macOS system are similar to removing Tor from a Windows system. Deleting Tor according to the directions leaves many artifacts behind on macOS. Like Windows, the places.sqlite, extensions.json, and other files that reside within the Tor Browser user files are deleted. FIG. 5C is a diagram of the Framework 100 illustrating macOS Local Install Tor Deleted Tor Browser Files-User Information, in accordance with one or more embodiments of the present disclosure.

Windows Registry Artifacts

The following sections describe artifacts 102 in the Windows Registry after use of Tor. Both running Tor from a USB drive or SD card and installing it locally on to a Windows PC, leave traces in the Windows Registry. Booting to Tails happens before the locally installed operating system boots, so using Tails does not leave traces in the Windows Registry.

Tor USB Install

Installing Tor onto a USB drive, then launching Tor from a Windows PC target device 104 leaves several artifacts in the Windows Registry. Some artifacts 102 for both Tor and the USB drive that was inserted can be identified. FIG. 4F is a diagram of the Framework 100 illustrating Windows Tor from USB (SD Card) HD Registry Information, in accordance with one or more embodiments of the present disclosure.

Several artifacts of the Tor Browser are found in the NTUSER.DAT file for the user who launched Tor in the SOFTWARE key including PropertyStore, AppBadgeUpdated, Compatibility Assistant and the Firefox Launcher. FIG. 19 is a diagram of the Framework 100 illustrating Windows Tor from USB (SD Card) NTUSER.DAT artifacts, in accordance with one or more embodiments of the present disclosure.

USB drive or SD card information is found in several areas of the Windows Registry including the SYSTEM key, SOFTWARE key, and registry log files. The make, model, and serial number of the USB drive can be found in these entries. On their own, the make and model of USB drive does not definitively prove that the USB drive or SD card in question was used to start Tor. However, if the USB drive or SD card is also found with the target device in question it can be definitively linked by locating the serial number on the USB drive and connecting it to the entries in the registry. FIG. 4F is a diagram of the Framework 100 illustrating Windows Tor from USB (SD Card) USB Registry SYSTEM artifacts, in accordance with one or more embodiments of the present disclosure.

The SOFTWARE key, registry log files, and Amcache hive files also contain indicators of USB drive and SD card use and identification. FIG. 4F is a diagram of the Framework 100 illustrating Windows Tor from USB (SD Card) USB Registry Artifacts, in accordance with one or more embodiments of the present disclosure.

Tor Local Install

Installing Tor locally on a Windows PC target device 104 leaves traces of Tor in both the SYSTEM registry file and the NTUSER.DAT file of the user who installed Tor. This is true both with Tor still installed and with Tor uninstalled from the target device 104. FIG. 4C is a diagram of the Framework 100 illustrating Windows Tor Local Registry information, in accordance with one or more embodiments of the present disclosure. FIG. 4C is a diagram of the Framework 100 illustrating Windows Tor Local Registry SOFTWARE information, in accordance with one or more embodiments of the present disclosure. FIG. 4C is a diagram of the Framework 100 illustrating Windows Tor Local Registry SYSTEM information, in accordance with one or more embodiments of the present disclosure. Both still installed and uninstalled, Tor artifacts remain in multiple locations in the SOFTWARE key of the NTUSER.DAT file of the user who installed Tor.

Dark Web Site History

The following sections describe artifacts 102 associated with specific content such as dark web sites that were accessed on the target device 104. The way Tor is used is relevant when locating host-based artifacts 102 on a target device 104 that has been used to access the dark web. As stated previously herein, this illustrative Framework 100 provides artifacts 102 associated with default settings of Tor. Changing the settings can alter the security of what Tor saves. As installed, Tor allows for bookmarking websites and enabling add-ons which leave artifacts 102 behind in the places.sqlite and extensions.json files.

If the sites being bookmarked are dark web sites, they can be identified by investigators. The presence of the places.sqlite database file is dependent on where Tor was launched from and whether or not the user has deleted Tor from the system. Tor launched from a USB drive will leave the places.sqlite database file on the USB drive rather than on the hard drive of the system. If Tor has been deleted from the system, it may no longer be on the system or may show as a deleted file.

Add-ons that the user installs while using the Tor Browser will be found in the extensions.json file, found in the same location as the places.sqlite file. FIG. 5A is a diagram of the framework 100 illustrating Windows .onion Locations, in accordance with one or more embodiments of the present disclosure. FIG. 5A is a diagram of the Framework 100 illustrating macOS .onion Locations, in accordance with one or more embodiments of the present disclosure.

Memory Capture

A memory capture of a target device 104 that has been accessing the dark web also can reveal traces of sites that were visited and images of both Tor and those sites. Each operating system revealed dark web artifacts in memory. The number of artifacts 102 is dependent on whether or not the target device 104 has been shut down for a significant amount of time after the dark web site was accessed, however traces can still remain in the pagefile.sys of a Windows system. Some artifacts 102 that can be found in memory include .onion sites, images from dark web sites, and Tor icons. The operating system and whether or not Tor was launched from a USB drive or SD card or installed locally are less important than if the target device 104 was shut down. FIG. 5B is a diagram of the framework 100 illustrating Memory Capture Artifacts, in accordance with one or more embodiments of the present disclosure.

Images that may be recovered include logos from dark web sites as shown below for Empire Market, Tor Browser icons, and images downloaded from dark web sites.

Tails

The following sections describe artifacts 102 associated with execution of Tor on Tails. The Tails website states that using Tails leaves no trace on the target device 104, which may be true if done in a certain manner. However, Tails contains an option to create persistent storage if it is started from a USB drive. The information stored on persistent storage can include documents, email, chat sessions, and other software information. Tails warns about the security implications of creating persistent storage with the persistent storage being protected by a passphrase. As with other passwords or passphrases, the simpler the password the easier it is to compromise. When imaging a USB drive that has an installation of Tails with persistent storage enabled, it may not be obvious to investigators that the drive potentially contains a significant amount of evidence. Creating an image of the Tails USB drive using FTK Imager (or other similar software) produces an image with both a Tails partition and a TailsData partition.

The TailsData partition is seen as an Unrecognized file system in FTK Imager requiring an examiner to follow additional steps to read the data that has been stored in persistent storage. Tails persistent storage is encrypted using LUKS encryption.

Being able to read the data stored within the persistent storage partition may be dependent on the investigator either knowing the user's passcode or being able to crack the passcode with a tool such as, but not limited to, Hashcat.

A Tails USB drive from a user that sets a complicated passphrase is unlikely to provide any useful evidence to an investigator. With a known or simple passphrase, an investigator has several steps to go through to export, decrypt, and perform further steps to eventually be able to examine the data and information contained within the persistent storage. The example embodiment of the framework 100 provides steps and links to further information to walk an investigator through these required steps in order to reveal the hidden information.

FIG. 6A is a diagram of the framework 100 illustrating Tails Initial Branching, in accordance with one or more embodiments of the present disclosure. Upon acquiring the Tails USB, the investigator first images the drive using FTK Imager or similar imaging tool.

The framework 100 then includes a node 106 associated with whether the Tails USB includes encrypted storage. FIG. 6A is a diagram of the framework 100 illustrating Tails Encrypted Storage Branching, in accordance with one or more embodiments of the present disclosure. A user who has not enabled encrypted storage will leave no evidence on the USB drive so the investigation of the drive would stop. The presence of encrypted storage would then move the investigator forward to the next step of exporting the unrecognized partition as a raw 0.001 image file using FTK Imager. FIG. 6A is a diagram of the Framework 100 illustrating a Tails Export Unrecognized Partition branch, in accordance with one or more embodiments of the present disclosure.

Once the image is exported, it needs to be decrypted before it can be examined. FIG. 6B is a diagram of the framework 100 illustrating Tails Decrypt, Mount, Copy, and Reimage branches, in accordance with one or more embodiments of the present disclosure. Tails uses Linux Unified Key System (LUKS) encryption to encrypt the persistent storage partition as described previously herein. A tool that decrypts LUKS partitions is the cryptsetup utility for Linux. The 0.001 raw image file is then copied to a Linux machine to perform the decryption. If the password is known the decryption steps can move forward. If the password is not known a utility such as Hashcat can be used to attempt to obtain the password. Once decrypted, the image can be mounted for viewing in Linux. To perform a full forensic exam the decrypted image is copied back to the original forensics workstation and processed with FTK or similar program. Some artifacts 102 that are recoverable include bookmarks in the places.sqlite file, which will show sites that the user has saved including dark web sites. Nm-system-connections shows Wi-Fi connections that the Tails drive has connected to and includes the Wi-Fi password. Other artifacts 102 include Pidgin log files which contain internet chat sessions, thunderbird email, and stored passwords. FIG. 6B is a diagram of the framework 100 illustrating artifacts 102 associated Tails Process Decrypted Image with FTK, in accordance with one or more embodiments of the present disclosure.

Referring again to FIGS. 1B-1F, in embodiments, the one or more processors 120 may be communicatively coupled to one or more user devices 118 via a network 136. For example, the one or more processors 120 and/or the one or more user devices 118 may include a network interface device 136 and/or the communication circuitry suitable for interfacing with the network.

In embodiments, the one or more processors 120 may be communicatively coupled to one or more target devices 104 via a network. For example, the one or more processors 120 and/or the one or more target device 104 may include a network interface device and/or the communication circuitry suitable for interfacing with the network.

The one or more processors 114, 120 may receive information from other systems or sub-systems communicatively coupled to the one or more processors by a transmission medium that may include wireline and/or wireless portions. The one or more processors may additionally transmit data or information to one or more systems or sub-systems communicatively coupled to the one or more processors by a transmission medium that may include wireline and/or wireless portions. In this regard, the transmission medium may serve as a data link between the one or more processors and the other systems or sub-systems communicatively coupled to the one or more processors. Additionally, the one or more processors may be configured to send data to external systems via a transmission medium (e.g., network connection).

The communication circuitry of the user device or target device may include any network interface circuitry or network interface device suitable for interfacing with network 136. For example, the communication circuitry may include wireline-based interface devices (e.g., DSL-based interconnection, cable-based interconnection, T9-based interconnection, and the like). In another embodiment, the communication circuitry may include a wireless-based interface device employing GSM, GPRS, CDMA, EV-DO, EDGE, WiMAX, 3G, 4G, 4G LTE, 5G, Wi-Fi protocols, RF, LoRa, and the like.

In embodiment, the one or more user devices 118 may be configured to receive one or more user inputs from a user. For example, the one or more user devices 118 may include the user interface, wherein the user interface includes a display 126 and a user input device 128. The one or more processors may be configured to generate the graphical user interface 124 of the display 126, wherein the graphical user interface includes the one or more display pages configured to transmit and receive data to and from a user.

The display may be configured to display various selectable buttons, selectable elements, text boxes, and the like, in order to carry out the various steps of the present disclosure. In this regard, the user device may include any user device known in the art for displaying data to a user including, but not limited to, mobile computing devices (e.g., smart phones, tablets, smart watches, and the like), laptop computing devices, desktop computing devices, and the like. By way of another example, the user device may include one or more touchscreen-enabled devices. In embodiments, the display includes a graphical user interface, wherein the graphical user interface includes one or more display pages configured to display and receive data/information to and from a user. The display may include any display device known in the art. For example, the display may include, but is not limited to, a liquid crystal display (LCD), an organic light-emitting diode (OLED) based display, a CRT display, and the like.

The user input device may be coupled with the display by a transmission medium that may include wireline and/or wireless portions. The user input device may include any user input device known in the art. For example, the user input device may include, but is not limited to, a keyboard, a keypad, a touchscreen, a lever, a knob, a scroll wheel, a track ball, a switch, a dial, a sliding bar, a scroll bar, a slide, a handle, a touch pad, a bezel input device or the like. In the case of a touchscreen interface, several touchscreen interfaces may be suitable. For instance, the display may be integrated with a touchscreen interface, such as, but not limited to, a capacitive touchscreen, a resistive touchscreen, a surface acoustic based touchscreen, an infrared based touchscreen, or the like.

In embodiments, the one or more processors may include any one or more processing elements known in the art. In this sense, the one or more processors may include any microprocessor-type device configured to execute software algorithms and/or instructions. For example, the one or more processors may consist of a desktop computer, mainframe computer system, workstation, image computer, parallel processor, or other computer system (e.g., networked computer) configured to execute a program configured to operate the system, as described throughout the present disclosure. It should be recognized that the steps described throughout the present disclosure may be carried out by a single computer system or, alternatively, multiple computer systems. Furthermore, it should be recognized that the steps described throughout the present disclosure may be carried out on any one or more of the one or more processors. In general, the term "processor" may be broadly defined to encompass any device having one or more processing elements, which execute program instructions from memory. Moreover, different subsystems of the system (e.g., user device, network, processors) may include processor or logic elements suitable for carrying out at least a portion of the steps described throughout the present disclosure. Therefore, the above description should not be interpreted as a limitation on the present disclosure but merely an illustration.

The memory may include any storage medium known in the art suitable for storing program instructions executable by the associated one or more processors. For example, the memory may include a non-transitory memory medium. For instance, the memory may include, but is not limited to, a read-only memory (ROM), a random-access memory (RAM), a magnetic or optical memory device (e.g., disk), a solid-state drive, and the like. It is further noted that memory may be housed in a common controller housing with the one or more processors. In an alternative embodiment, the memory may be located remotely with respect to the physical location of the processors, user device, and the like. For instance, the one or more processors may access a remote memory (e.g., server), accessible through a network (e.g., internet, intranet and the like). The memory may also maintain program instructions for causing the one or more processors to carry out the various steps described through the present disclosure.

It is further contemplated that each of the embodiments of the method described above may include any other step(s) of any other method(s) described herein. In addition, each of the embodiments of the method described above may be performed by any of the systems described herein.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A method, the method comprising:
   receiving a first operating system selection for a target device;
   receiving a first dark web software installation method selection for the target device;
   recursively selecting, based on one or more forensic choices associated with the first operating system selection, a first series of selectable nodes of a dark web artifact framework until a first plurality of artifact descriptors for the target device are generated, the first series of selectable nodes associated with the first selected operating system of the target device and the selected dark web software installation method selection, a selectable node of the first series of selectable nodes coupled to an additional node of the first series of selectable nodes via one or more branch segments, the first plurality of artifact descriptors including at least one of file locations of one or more host-based artifacts or actions required to obtain the one or more host-based artifacts;
   receiving a second operating system selection for the target device,
   wherein the second operating system selection is for a different operating system than the first operating system selection;
   receiving a second dark web installation method selection for the target device;
   recursively selecting, based on one or more forensic choices associated with the second operating system selection, a second series of selectable nodes of a dark web artifact framework until a second plurality of artifact descriptors for the target device are generated, the second series of selectable nodes associated with the second selected operating system of the target device and the selected second dark web software installation method selection, a selectable node of the second series of selectable nodes coupled to an additional node of the second series of selectable nodes via one or more branch segments, the second plurality of artifact descriptors including at least one of file locations of one or more host-based artifacts or actions required to obtain the one or more host-based artifacts;
   identifying the one or more host-based artifacts on the target device based on the generated first or second plurality of artifact descriptors, the one or more host-based artifacts indicative of dark web activity on the target device; and
   displaying one or more visual indicators indicating one or more user selections of the first series of selectable nodes or the second series of selectable nodes.

2. The method of claim 1, wherein the dark web activity comprises:
   use of a dark web software program.

3. The method of claim 2, wherein the dark web software program comprises:
   an anonymized browser.

4. The method of claim 2, wherein the dark web software program comprises:
   The Onion Browser (TOR).

5. The method of claim 2, wherein at least one of the one or more host-based artifacts includes an artifact indicative of installation of the dark web software.

6. The method of claim 2, wherein at least one of the one or more host-based artifacts includes an artifact indicative of operation of the dark web software.

7. The method of claim 2, wherein at least one of the one or more host-based artifacts includes an artifact indicative of content of dark web activity using the dark web software.

8. The method of claim 1, wherein the selection of an operating system of the target device comprises:
   selection of the operating system from at least one of Windows, macOS, or Tails.

9. The method of claim 1, wherein receiving an operating system selection for a target device comprises:
   receiving the operating system selection for the target device from a user input device of a user device, wherein the user device is configured to display an interactive graphical user interface including the dark web artifact framework.

10. The method of claim 1, wherein the selection of a dark web software installation method comprises:
    selection of the dark web software installation method from at least one of locally installed or installed via a computer readable medium.

11. A non-transitory computer readable medium storing a dark web artifact framework program including a set of program instructions, when executed by one or more processors on a target device, cause the one or more processors to:
    identify a first operating system of the target device;
    identify a first dark web software installation method;
    recursively execute, based on one or more forensic choices associated with the first operating system, a first series of selectable nodes of the dark web artifact framework until a first plurality of artifact descriptors for the target device are generated, the first series of selectable nodes associated with the identified first operating system of the target device and the identified first dark web software installation method selection, a node of the first series of selectable nodes coupled to an additional node of the first series of selectable nodes via one or more branch segments, the first plurality of artifact descriptors associated with one or more host-based artifacts indicative of dark web activity, the first plurality of artifact descriptors including at least one of file locations of the one or more host-based artifacts or actions required to obtain the one or more host-based artifacts;
    identify a second operating system of the target device, wherein the second operating system is different from the first operating system;
    identify a second dark web software installation method;
    recursively execute, based on one or more forensic choices associated with the second operating system, a second series of selectable nodes of the dark web artifact framework until a second plurality of artifact descriptors for the target device are generated, the second series of selectable nodes associated with the identified second operating system of the target device and the identified second dark web software installation method selection, a node of the second series of selectable nodes coupled to an additional node of the second series of selectable nodes via one or more branch segments, the second plurality of artifact descriptors associated with one or more host-based artifacts indicative of dark web activity, the second plurality of artifact descriptors including at least one of file locations of the one or more host-based artifacts or actions required to obtain the one or more host-based artifacts;

identify the one or more host-based artifacts on the target device based on the generated plurality of artifact descriptors; and display one or more visual indicators indicating one or more user selections of the first series of selectable nodes or the second series of selectable nodes.

12. The non-transitory computer readable medium of claim 11, wherein the one or more processors are further configured to:

generate a dark web activity prediction report including one of the generated plurality of artifact descriptors or the identified one or more host-based artifacts on the target device.

13. The non-transitory computer readable medium of claim 12, wherein the one or more processors are further configured to:

generate one or more controls signals configured to cause a display of the target device to display the generated dark web activity prediction report.

14. The non-transitory computer readable medium of claim 12, wherein the one or more processors are further configured to:

provide the generated dark web activity prediction report to a user device for display on the user device.

15. The non-transitory computer readable medium of claim 12, wherein the generated dark web activity prediction report comprises an HTML document report.

16. The non-transitory computer readable medium of claim 11, wherein the non-transitory computer readable medium comprises:

a flash drive, a floppy disk, or a CD-ROM.

17. The non-transitory computer readable medium of claim 11, wherein the executable file comprises an .exe file.

18. The non-transitory computer readable medium of claim 11, wherein the one or more host-based artifacts include one or more .onion sites.

19. A system, the system comprising:

a user device including a display and a user input device, the display configured to display an interactive graphical user interface (GUI) including a dark web artifact framework, the dark web artifact framework including a first series of selectable nodes, a second series of selectable nodes, a series of branch segments, and a plurality of end-nodes, the series of branch segments configured to link a node of the first or second series of selectable nodes to one or more additional nodes of the first or second series of selectable nodes responsive to a selection via the user input device, the plurality of end-nodes associated with a plurality of artifact descriptors;

the user device configured to:

receive, via the user input device and the interactive GUI, a first operating system selection for a target device;

receive, via the user input device and the interactive GUI, a first dark web software installation method selection for the target device; and recursively receive, via the user input device and the interactive GUI, one or more user selections of the first series of selectable nodes until a first plurality of artifact descriptors for the target device are generated, the one or more user selections of the first series of selectable nodes based on one or more forensic choices of the user, the first series of selectable nodes associated with a first selected operating system of the target device and a first selected dark web software installation method, the generated first plurality of artifact descriptors associated with one or more host-based artifacts, the first plurality of artifact descriptors including at least one of file locations of one or more host-based artifacts or actions required to obtain the one or more host-based artifacts;

receive, via the user input device and the interactive GUI, a second operating system selection for a target device;

receive, via the user input device and the interactive GUI, a second dark web software installation method selection for the target device;

recursively receive, via the user input device and the interactive GUI, one or more user selections of the second series of selectable nodes until a second plurality of artifact descriptors for the target device are generated, the one or more user selections of the second series of selectable nodes based on one or more forensic choices of the user, the second series of selectable nodes associated with a second selected operating system of the target device and a second selected dark web software installation method, the generated second plurality of artifact descriptors associated with the one or more host-based artifacts, the second plurality of artifact descriptors including at least one of file locations of one or more host-based artifacts or actions required to obtain the one or more host-based artifacts; and display one or more visual indicators indicating one or more user selections of the first series of selectable nodes or the second series of selectable nodes.

20. The system of claim 19, further comprising:

the target device including the one or more host-based artifacts indicative of dark web activity.

* * * * *